United States Patent [19]

Iwasaki

[11] Patent Number: 5,526,092
[45] Date of Patent: Jun. 11, 1996

[54] PHOTOMETRIC CONTROL DEVICE FOR CAMERA

[75] Inventor: Hiroyuki Iwasaki, Kawasaki, Japan

[73] Assignee: Nikon Corporation, Tokyo, Japan

[21] Appl. No.: 242,067

[22] Filed: May 13, 1994

Related U.S. Application Data

[63] Continuation of Ser. No. 118,404, Sep. 9, 1993, abandoned.

[30] Foreign Application Priority Data

Sep. 11, 1992 [JP] Japan .................................. 4-243778
Oct. 19, 1992 [JP] Japan .................................. 4-279954

[51] Int. Cl.$^6$ ........................................... G03B 7/08
[52] U.S. Cl. ........................................... 354/432
[58] Field of Search ............................. 354/402, 432;
356/215, 222, 224; 250/214 P; 348/297, 298, 299

[56] References Cited

U.S. PATENT DOCUMENTS

| | | | |
|---|---|---|---|
| 4,399,464 | 8/1983 | Hix et al. .......................... | 348/297 X |
| 4,791,446 | 12/1988 | Ishida et al. ...................... | 354/432 X |
| 4,843,417 | 6/1989 | Ishida et al. ...................... | 354/432 X |
| 5,008,698 | 4/1991 | Muramatsu et al. ................ | 354/432 X |
| 5,182,447 | 1/1993 | Nakayama ........................ | 348/297 X |
| 5,194,960 | 3/1993 | Ota ................................. | 358/213.19 X |

FOREIGN PATENT DOCUMENTS 62-259022 11/1987 Japan .
2-280581 11/1990 Japan .

*Primary Examiner*—W. B. Perkey
*Attorney, Agent, or Firm*—Oliff & Berridge

[57] ABSTRACT

A photometric control device for a camera, comprises an electric charge-accumulation type of photoelectric conversion device 7 having plural picture elements for photoreceiving and photoelectrically converting a flux of lights from plural regions of a subject field and outputting the respective photoelectric conversion outputs as photometric signals for exposure value calculation; an accumulation time calculating device 13 for calculating an accumulation time for a next operation of the photoelectric conversion device 7 using at least one of information on the maximum value of the photometric signals from the photoelectric conversion device 7 and information on the minimum value of the photometric signals from the photoelectric conversion device 7; and a control device 14 for actuating the photoelectric conversion device 7 for the calculated accumulation time.

58 Claims, 15 Drawing Sheets

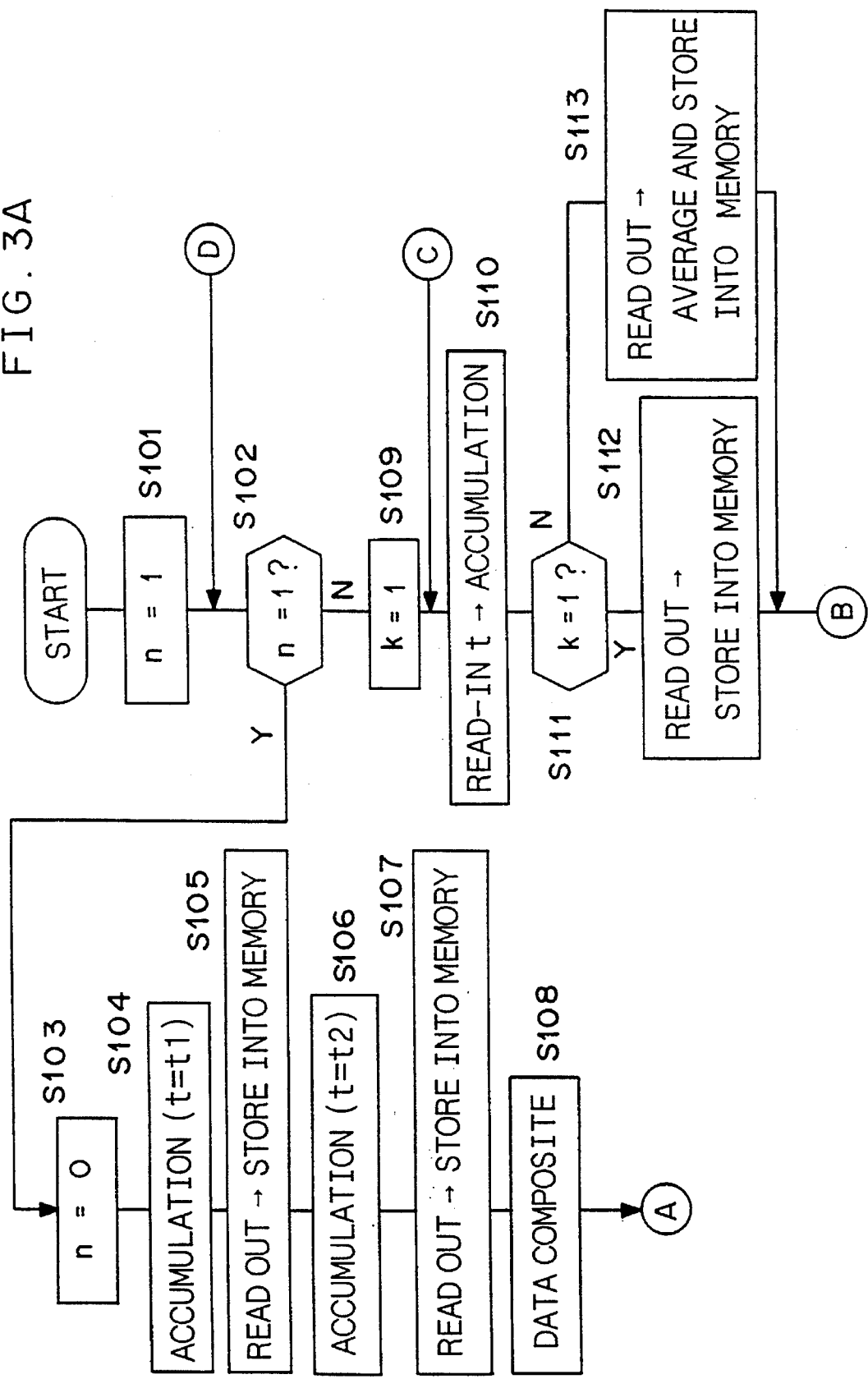

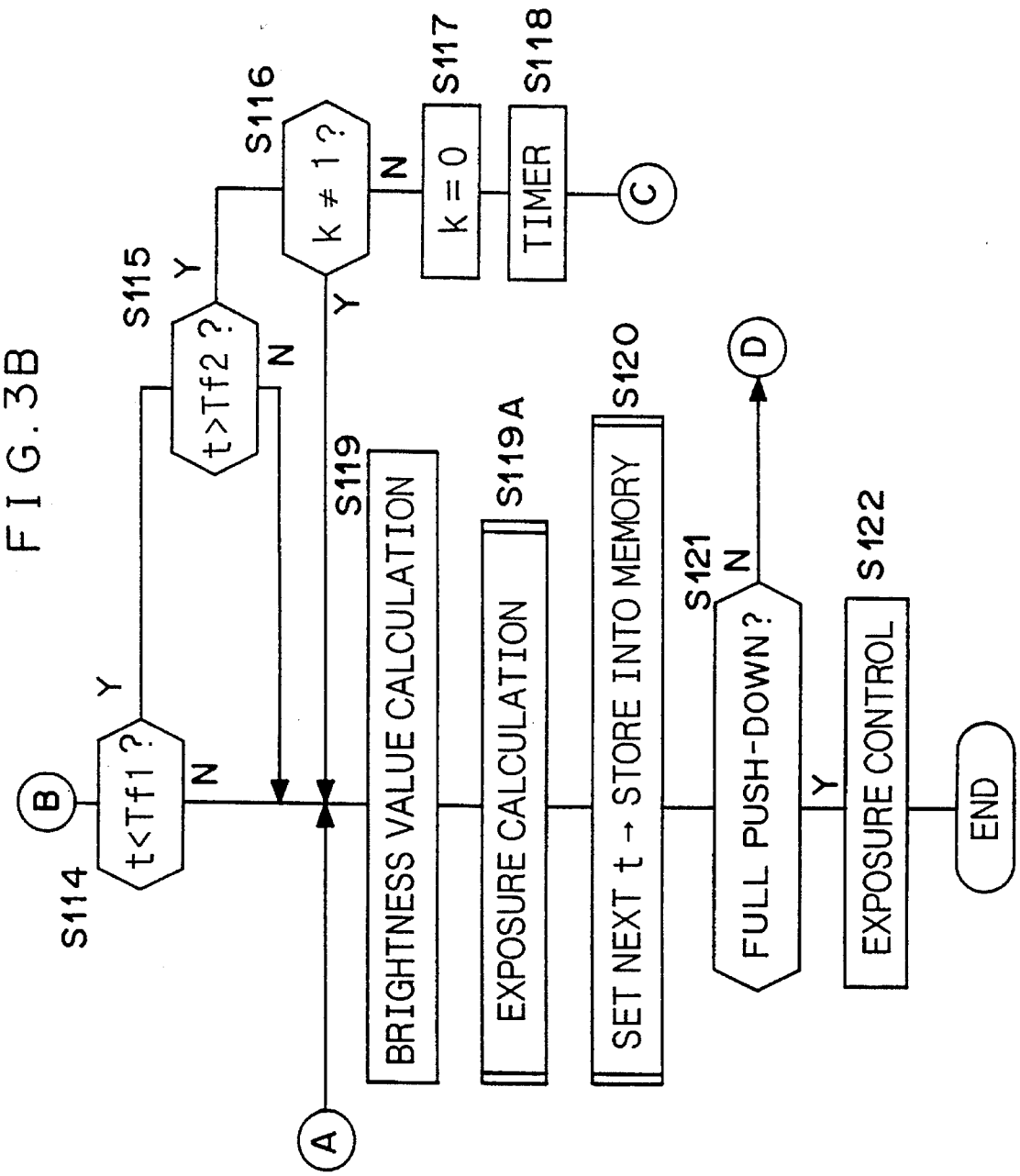

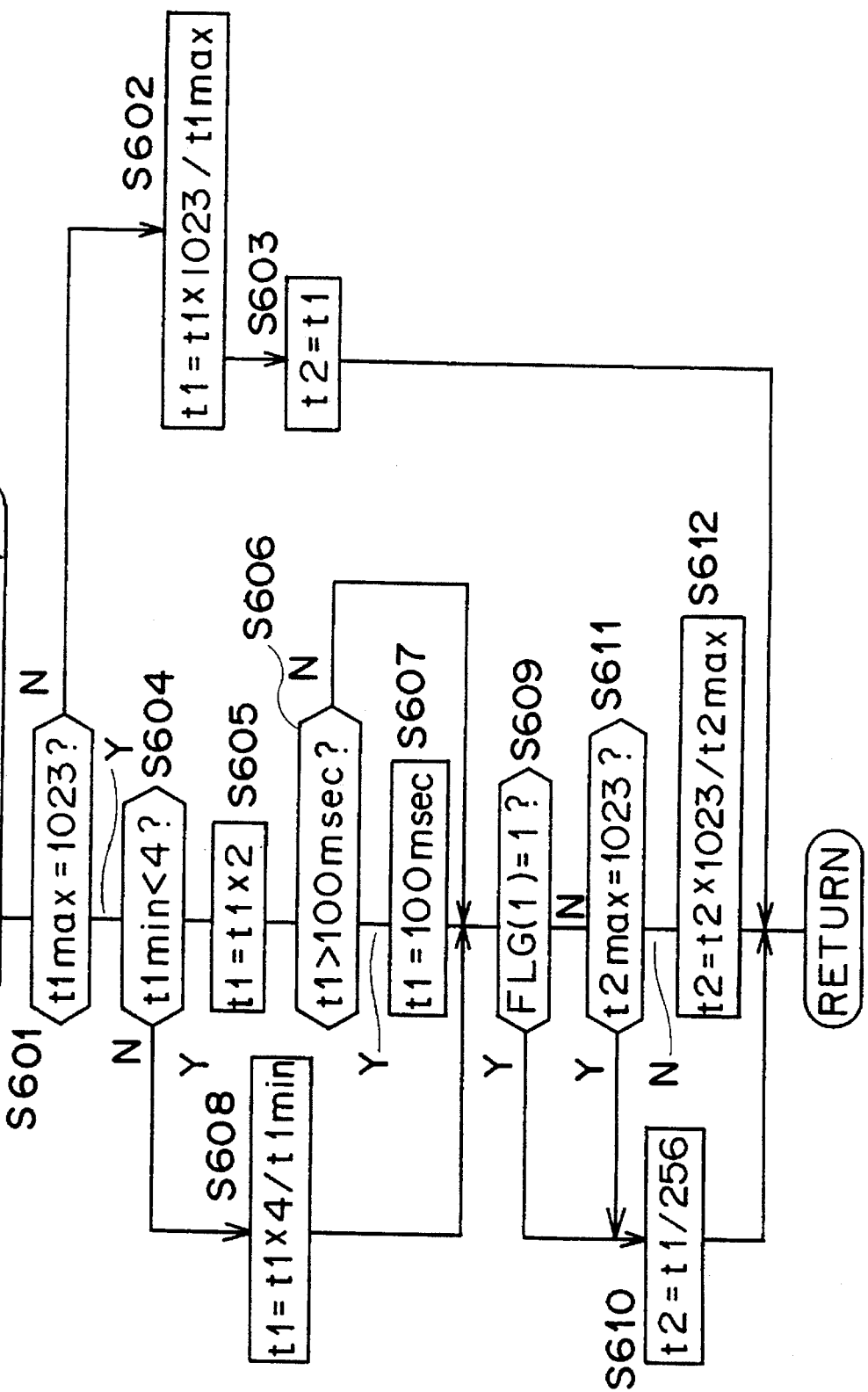

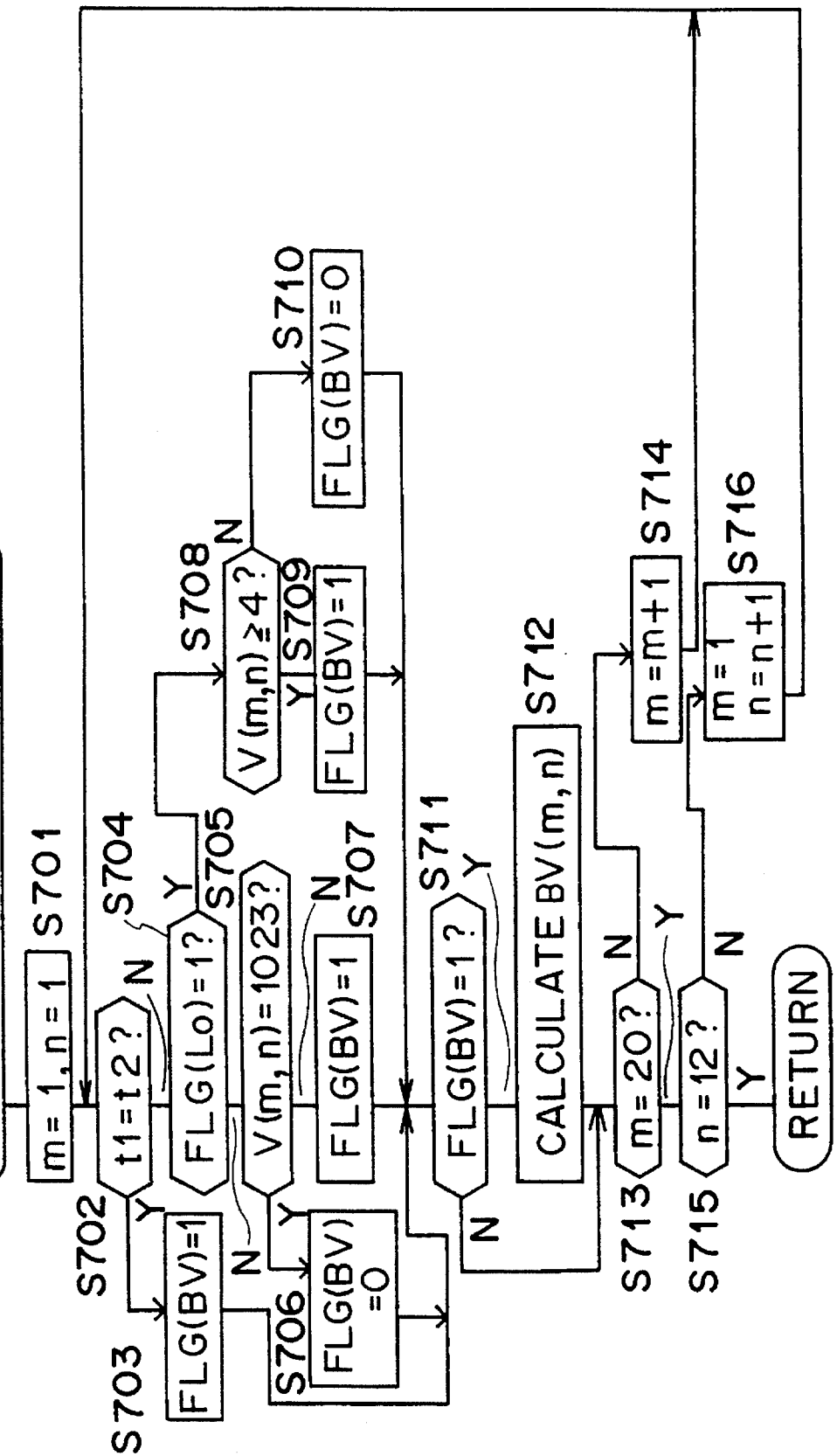

PHOTOMETRIC CONTROL DEVICE FOR CAMERA

This is a Continuation of U.S. application Ser. No. 08/118,404 filed Sep. 9, 1993, now abandoned.

BACKGROUND OF THE INVENTION

1. Field of the Invention

This invention relates to a photometric control device for a camera in which a photometry is conducted by dividing a subject field into plural photometric regions, and particularly to a photometric control device using as a photoelectric conversion device an electric charge accumulation-type of photoelectric conversion device having plural picture elements which are matched with the number of divided photometric regions of the subject field.

2. Related Background Art

A photometric control device for a camera as disclosed in Japanese Laid-open Patent Application No. 2-280581 has been representatively known as a photometric control device for a camera in which a photometry is conducted on a subject field using an electric charge-accumulation type of photoelectric conversion device such as a CCD (Charge Coupled Device). This photometric control device uses a photoelectric conversion device serving as a photographing element to conduct a photometry. In this photometric control device, all of photoelectric conversion outputs which are obtained from plural picture elements constituting the photoelectric conversion device (corresponding to photometric signals for plural photometric regions of a subject field) are summed up, and an exposure time is controlled on the basis of the sum value.

On the other hand, Japanese laid-open Patent Application No. 62-259022 discloses a photometric control device using an integration type of photoelectric conversion device for focus-detecting to conduct a photometry. In this photometric control device, an integrating operation is conducted plural times using the photoelectric conversion device to obtain an average value of integration times of the respective photometric integrating operations, and the brightness value of a subject field is calculated on the basis of the average value.

A photometric brightness range which is generally required for a photometric control device for a camera is set to EV0 to EV20, that is, about EV20 in dynamic range. The dynamic range (a measurable brightness range in one photometry) of an electric charge accumulation-type of photoelectric conversion element such as a CCD available in the market is set to about 10 EV at maximum. However, in the electric charge accumulation-type of photoelectric conversion device, as the accumulation time is set to be longer, the measurable photometric brightness range is shifted to a lower brightness side. On the other hand, as the accumulation time is set to be shorter, the measurable photometric brightness range is shifted to a higher brightness side. Therefore, by controlling the accumulation time in accordance with the actual brightness of a subject field, the photometry can be accurately conducted on the subject field even if the photoelectric conversion device has a small dynamic range, and thus a proper exposure value can be calculated.

In the photometric control device as disclosed in Japanese Laid-open Patent Application No. 2-280581, the photometric signals for all the photometric regions of the subject field are summed up, and the accumulation time of the photoelectric conversion device is controlled in accordance with the sum value. Therefore, the accumulation time, that is, the photometric brightness range is necessarily set on the basis of average brightness in the subject field. This setting method of the accumulation time frequently induces a disadvantage that photometric signals at the low-brightness side or high-brightness side are not obtained even if photometry is conducted several times, and thus no proper exposure value can be obtained. Further, in the photometric control device as disclosed in Japanese Laid-open Patent Application No. 62-259022, no consideration is made to the dynamic range problem of the photoelectric conversion device as described above. Therefore, in this case, like the above case, there frequently occurs a case where the photometric brightness range is set to an undesired range, and thus no proper exposure value can be calculated.

SUMMARY OF THE INVENTION

An object of this invention is to provide a photometric control device for a camera in which the accumulation time of a photoelectric conversion device is controlled to the optimum value to enable an accurate photometric operation even when the used photoelectric conversion device used has a small dynamic range.

In order to attain the above object, a photometric control device for a camera according to one aspect of this invention comprises an electric charge-accumulation type of photoelectric conversion device for photoreceiving and photoelectrically converting a flux of lights from plural regions of a subject field through plural picture elements and outputting the respective photoelectric conversion outputs as photometric signals for exposure value calculation, accumulation time calculating means for calculating an accumulation time for a next operation of the photoelectric conversion device using at least one of information on the maximum value of the photometric signals from the photoelectric conversion device and information on the minimum value of the photometric signals from the photoelectric conversion device, and control means for actuating the photoelectric conversion device for the calculated accumulation time.

According to this invention, the accumulation time for the next photometry is calculated using at least one of the information on the maximum value and the information on the minimum value of the plural photometric signals. For example, the accumulation time is so calculated that the average value of the maximum and minimum values of brightness values which are calculated on the basis of the photometric signals is set to the median value of the brightness values. Accordingly, the possibility that the brightness values of all the photometric regions of the subject field will be located within the photometric brightness range in the next photometry becomes higher, and thus the accurate photometric operation can be carried out and a proper exposure value can be calculated even when a photoelectric conversion device having a small dynamic range is used.

When the maximum value of the brightness values is the upper-limit value of the photometric brightness range of the photoelectric conversion device (when the possibility that a region whose brightness exceeds the upper-limit value exists is high), the number of the maximum values is counted. On the other hand, when the minimum value of the brightness values is the lower-limit value of the photometric brightness range of the photoelectric conversion device (when the possibility that a region whose brightness is lower than the lower-limit value exists is high), the number of the minimum values is counted. If the number of the maximum values is larger than the number of the minimum values, the accumulation time for the next photometry of the photoelectric conversion device is set to be shorter than that for the current photometry. That is, the photometric brightness range is shifted to the high-brightness side. On the other hand, if the number of the maximum values is smaller than the number of the minimum values, the accumulation time for the next photometry of the photoelectric conversion device is set to be longer than that for the current photometry. That is, the photometric brightness range is shifted to the low-brightness side. Accordingly, even when the difference between the maximum brightness and the minimum brightness in the subject field exceeds the dynamic range of the photoelectric conversion device, the photometric brightness range of the photoelectric conversion device can be set to the proper range, and the proper exposure can be more frequently obtained.

Further, a photometric control device for a camera according to another aspect of this invention includes an electric charge-accumulation type of photoelectric conversion device for photoreceiving and photoelectrically converting a flux of lights from plural photometric regions of a subject field through plural picture elements and outputting the respective photoelectric conversion outputs as photometric signals for exposure value calculation, accumulation time calculating means for calculating a low-brightness side accumulation time to conduct a low-brightness side photometry using the photoelectric conversion device and also calculating a high-brightness side accumulation time shorter than the low-brightness side accumulation time to conduct a high-brightness side photometry, and control means for actuating the photoelectric conversion device on the basis of the low-brightness side accumulation time calculated in the accumulation time calculating means to conduct the low-brightness side photometry, and actuating the photoelectric conversion device on the basis of the high-brightness side accumulation time calculated in the accumulation time calculating means to conduct the high-brightness side photometry.

According to this invention, the photoelectric conversion device is actuated on the basis of the low-brightness side accumulation time to conduct the low-brightness side photometric operation, and it is also actuated on the basis of the high-brightness side accumulation time to conduct the high-brightness side photometry. Through the low-brightness side photometry and the high-brightness side photometry, the whole photometric brightness range which is required for the photometric control device can be more frequently covered, and even if the whole photometric brightness range is not covered, the photometric brightness range can be broadened as much as possible. Therefore, the possibility of obtaining the proper exposure value can be improved.

Particularly in the case where the maximum value of the A/D conversion output of the low-brightness side photometric signals is lower than the upper-limit value of the A/D convertible range, if the low-brightness side accumulation time for a next low-brightness side photometry is so calculated that the above maximum value is equal to the upper-limit value of the A/D convertible range, the photometry for a lower brightness side can be further conducted in the next low-brightness side photometric operation, and thus the photometric brightness range can be substantially broadened.

Further, when the minimum value of the A/D conversion output of the low-brightness side photometric signals is lower than a predetermined value, if the low-brightness side accumulation time for a next low-brightness side photometry is set to be longer than the current low-brightness side accumulation time, aggravation in photometric accuracy which causes a dark current of the photometric conversion device or noises of a circuit (it is more remarkable when the photometric signal is small) can be suppressed at maximum. When the minimum value of the A/D conversion output of the low-brightness side photometric signals is above the predetermined value, if the low-brightness side accumulation time for a next low-brightness side photometry is so calculated that the minimum value of the A/D conversion output of the low-brightness side photometric signals is equal to the predetermined value, the photometry for a higher brightness side can be carried out in the next low-brightness side photometric operation, and thus the photometric brightness range can be broadened without inducing aggravation in photometry accuracy which causes the dark current or the noises.

Still further, if the high-brightness side accumulation time for the next high-brightness side photometry is so calculated that the minimum value of the high-brightness side photometric signals obtained in the next high-brightness side photometry is equal to the upper-limit value of the A/D convertible range in the next low-brightness side photometry, the photometry can be efficiently and continuously carried out from the low-brightness side to the high-brightness side.

Still further, in the case where the maximum value of the A/D conversion output of the high-brightness side photometric signals is lower than the upper-limit value of the A/D convertible range, if the high-brightness side accumulation time for the next high-brightness side photometry is so calculated that the above maximum value is equal to the upper-limit value of the A/D convertible range in the next high-brightness side photometry, the photometry for a lower brightness side can be carried out in the next high-brightness side photometric operation, and thus the photometric brightness range can be substantially broadened.

BRIEF DESCRIPTION OF THE DRAWINGS

FIGS. 3A and 3B are flowcharts showing a main algorithm;

FIG. 11 is a flowchart showing an accumulation-time calculating subroutine;

FIG. 12 is a flowchart showing a brightness-value calculating subroutine; and

DETAILED DESCRIPTION OF THE PREFERRED EMBODIMENTS

FIRST EMBODIMENT

Figure 1:
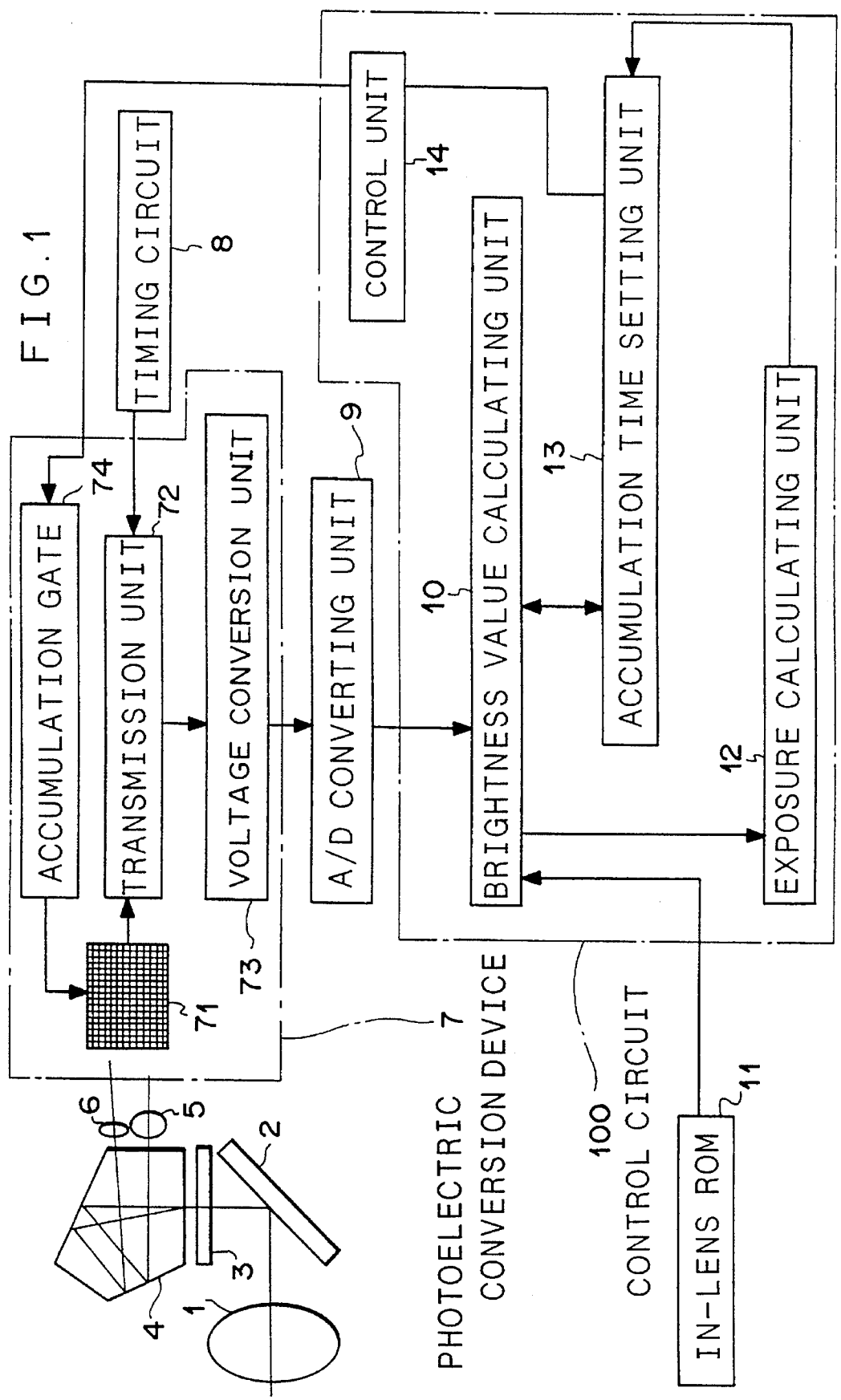
FIG. 1 is a diagram showing an optical system and a control system for a camera according to a first embodiment of this invention.
Figure 2:
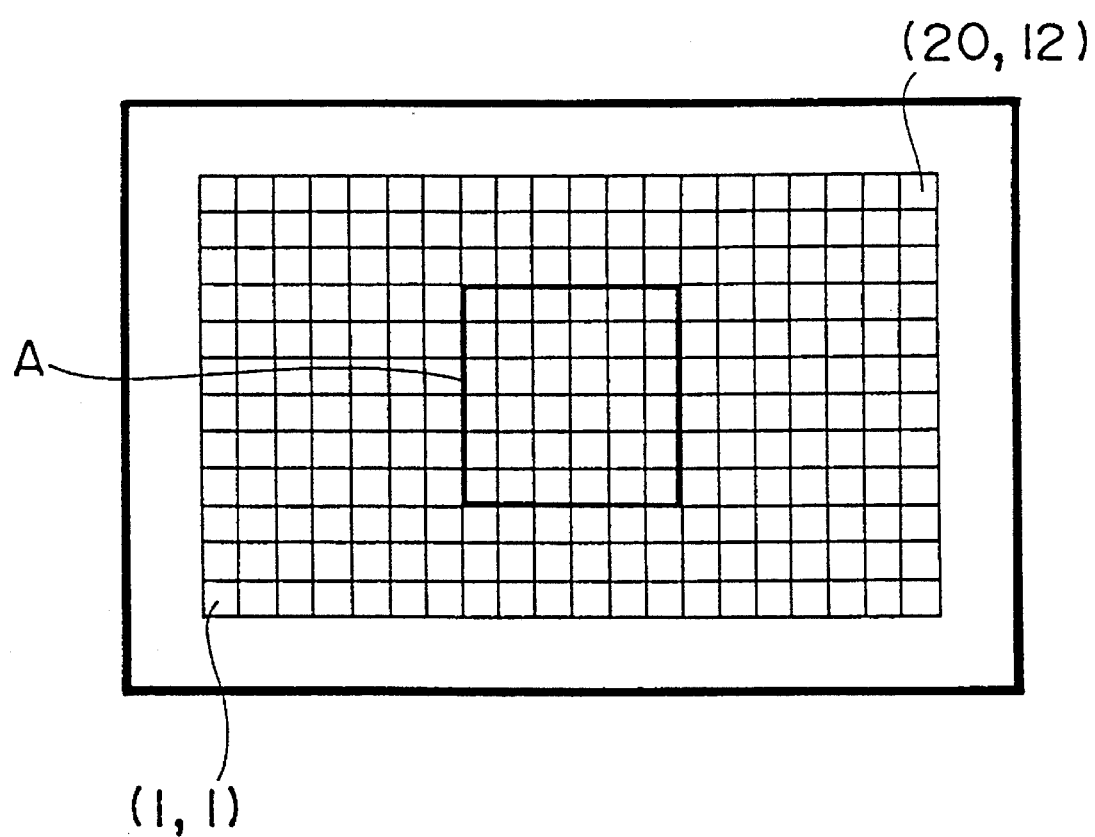
FIG. 2 is a divisional pattern of a photoelectric conversion device.

A first embodiment according to this invention will be described with reference to FIGS. 1 to 9.
<Optical System>
FIG. 1 shows the construction of an optical system of a camera. Reference numeral 1 represents a photographing lens, and light of a subject to be photographed (hereinafter referred to as "subject light") which has been passed through i the photographing lens 1 is directed through a quick return mirror 2, a diffusion screen 3, a pentagonal prism 4, and guided through an eyepiece 5 so as to be seen by photographer. On the other hand, a part of the subject light which is diffused by the diffusion screen 3 is directed through the pentagonal prism 4 and a lens 6 to a photoelectric conversion device 7.
<Photoelectric Conversion Device and Control System>
The photoelectric conversion device 7 comprises an electric charge accumulation-type of device such as a CCD sensor, and it includes a light-receiving and accumulating unit 71, a transfer unit 72, a current-to-voltage converter 73, and an accumulation gate 74. As shown in FIG. 2, the light-receiving and accumulating unit 71 comprises totally 240 segments (20 segments in a horizontal direction and 12 segments in a vertical direction, as shown in FIG. 2) which are arranged in a matrix form so as to enable a photometric operation for a subject field corresponding to the whole photographic field, and charges which are induced in each segment upon light irradiation thereto is accumulated in each segment.

A timing circuit 8 serves to produce a clock pulse required for electric charge transfer in response to a master clock which is input from a clock generating circuit (not shown), and inputs the clock pulse to the transfer unit 72. In accordance with the input clock pulse, the transfer unit 72 picks up the electric charges accumulated in every segment (picture element) of the light-receiving and accumulating unit 71, and transfers the pickup charges to the current-to-voltage converter 73 synchronized with each clock pulse. The current-to-voltage converter 73 serves to convert 240 charge signals input thereto into respective voltage level values, and outputs them to an A/D (analog-to-digital) converter 9 as a photometric signal. The A/D converter 9 converts the photometric signal (voltage signal) from the current-to-voltage converter 73 into a digital numeral signal so that a digital photometric operation in a control circuit 100 can be conducted, and outputs the converted digital signal. The accumulation gate 74 receives a pulse signal from a control unit 14 which constitutes a control circuit 100, and instructs the light-receiving and accumulating unit 71 to start and terminate the electric charge accumulation.

The control circuit 100 actually comprises a microcomputer. The microcomputer functionally comprises the accumulation-time setting unit 13 as described above, a control unit 14, a brightness calculating unit 10, and an exposure calculating unit 12. The accumulation-time setting unit 13 serves to calculate an optimum accumulation time for a next charge accumulating operation on the basis of information from brightness value calculating unit 10 and the exposure calculating unit 12, thereby adjusting an accumulated charge amount.

The brightness value calculating unit 10 serves to calculate a brightness value in accordance with lens information from an in-lens ROM 11, the accumulation time input from the accumulation-time setting unit 13, and the photometric signal of the A/D converter 9. The exposure calculating unit 12 receives a brightness signal from the brightness value calculating unit 10 to perform an exposure calculation for calculating a proper exposure value and determine an aperture and a shutter speed based on the proper exposure value.

Upon push-down of a release button (not shown), the mirror 2 is leapt up, and a diaphragm and a shutter are controlled to have calculated aperture and shutter speed to perform an exposure control operation.
<Necessity of Altering Accumulation Time>
The photometric brightness range which is required for a photometric control device for a camera is generally set to EV0 to EV20, that is, to about 20 EV in dynamic range. As described above, a photoelectric conversion element such as a CCD which is presently provided is set to about 10 EV at maximum in a dynamic range (a brightness range in which photometry can be conducted in one photometric operation). When a CCD is used as the photoelectric device 7, the photometric brightness range of the photoelectric device 7 is required to be properly shifted to the high-brightness side or low-brightness side by adjusting the accumulation time of the light-receiving and accumulating unit 71 in accordance with the brightness of each photometric region of the subject field, so that the brightness range of the actual subject field is accommodated in the photometric brightness range of the photoelectric conversion device 7 as much as possible.

Specifically, assuming that the brightness range of the subject field is EV0 to EV20, illuminance on the surface of the light-receiving element of the light-receiving and accumulating unit 71 is in the range of 0.01 Lx to 10000 Lx when a standard photographic lens is mounted in the camera. The light-receiving and accumulating unit 71 has a sensitivity of about 20 V/Lx·S, and has a saturated output of about 2 V. Therefore, the photometric brightness range is about EV10 to EV20 for the accumulation time of 10 µS, and is about EV0 to EV10 for the accumulation time of 10 mS. That is, the accumulation time of the light-receiving and accumulating unit 71 may be adjusted within the range of 10 µS to 10 mS.

When the CCD is used for the photometric operation, the photometric brightness range in one photometric operation is limited to a range of 10 EV for the reason as described above, however, no disadvantage occurs because the dynamic range of silver-halide films is further smaller than 10 EV.
<Main Algorithm>
FIGS. 3A and 3B are flowcharts for a main algorithm of the control circuit 100.

When the release button is pushed down halfway (hereinafter referred to as "half push-down operation"), the program as shown in FIGS. 3A and 3B are executed in the control circuit 100. At a step S101 a flag n is set to an initial value "1". This flag n is used as in identifier for judging whether there is a brightness value usable for a photometric operation which is about to be carried out. "n=1" indicates absence of a calculated brightness value, and "n=0" indicates presence of a calculated brightness value.

If n=1, that is, if absence of the calculated brightness value is judged at a step S102, at a step S103 the flag n is set to "0". Subsequently, at a step S104 the accumulation time t is set to a predetermined value of t1 (first accumulation time) and an accumulating operation by the light-receiving device 7 is carried out. In this embodiment, t1=10

μs, that is, the photometric brightness range is set to EV10 to EV20. At a step S105, 240 photometric signals are read out through the transfer unit 72 and the current-to-voltage converter 73 in response to a prescribed charge read-out pulse which is generated in the timing circuit 8, converted to digital numerical values by the A/D converter 9 and then stored in a memory (not shown). Hereinafter, the photometric signal converted in the A/D conversion unit 9 is represented by V.

In this embodiment, the resolution of the A/D conversion is set to 10 bits, and thus the A/D conversion output has a numeral ranging from 0 to 1023.

At a step S106, the accumulation time t of the second photometric operation in the case where there is no calculated brightness value is set to a predetermined value of t2 (second accumulation time) and the accumulating operation of the light-receiving device 7 is carried out again. In this embodiment, t2=10 ms, that is, the photometric brightness range is set to EV0 to EV10. At a step S107, the photometric signal is read out like the step S105, and the data is stored in a memory.

At a step S108, the photometric signal V stored at the step S105 and the photometric signal V stored at the step S107 are combined. That is, the photometric brightness range at the accumulation time t=t1 is from EV10 to EV20, and the photometric range at the accumulation time t=t2 is from EV0 to EV10. On the basis of the combination of these two photometric signals V, a photometric signal whose dynamic rage is from EV0 to EV20 is prepared. Specifically, 240 photometric signals V at t=t1 and t=t2 which are obtained at the steps S105 and S107 are searched, and the photometric signal V at t=t2 is used as a photometric signal V for regions whose photometric output is below the photometric lower-limit value, that is, below EV10 while the photometric signal V at t=t1 is used as a photometric result for regions whose photometric output is larger than the photometric lower-limit value. In this case, the accumulation time t2 is 1000 times of the accumulation time t1, and thus the photometric signal V at t=t1 is multiplied by 1000, or the photometric signal V at t=t2 is multiplied by 1/1000. Thereafter, the processing goes to a step S119.

On the other hand, if "n≠1" is judged at the step S102, that is, if there is a brightness value which has been already calculated, the process goes to a step S109 to set a variable "k" to "1". The "k" represents the number of photometric operations at a step S110. "k=1" indicates a first photometric operation, and "k=0" indicates a second photometric operation. At the step S110, the accumulation time t is read out from a memory, and the above accumulation operation is carried out on the basis of the accumulation time t. The accumulation time t is calculated at a step S120 as described later on the basis of a previous photometric signal.

The reason why the photometric operation at the step S110 is carried out twice will be described although it does not directly relate to the subject matter of this invention.

Figure 6:
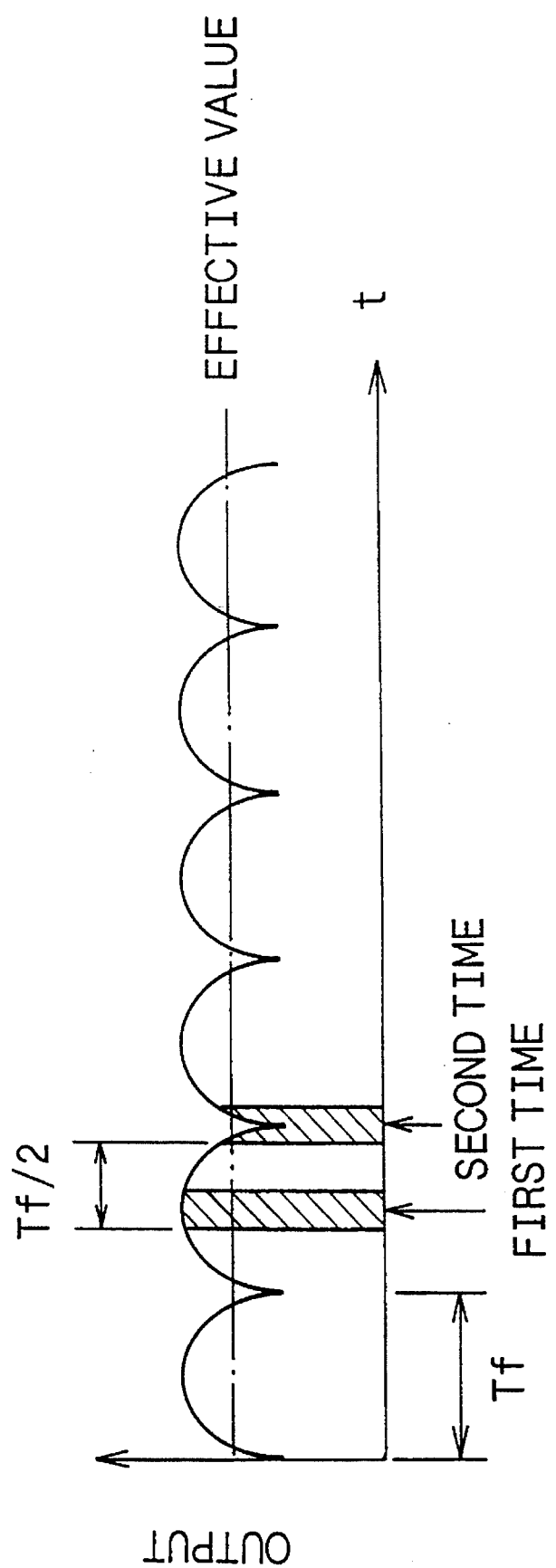
FIG. 6 is a schematic diagram showing the principle of removing a flicker.
Figure 7:
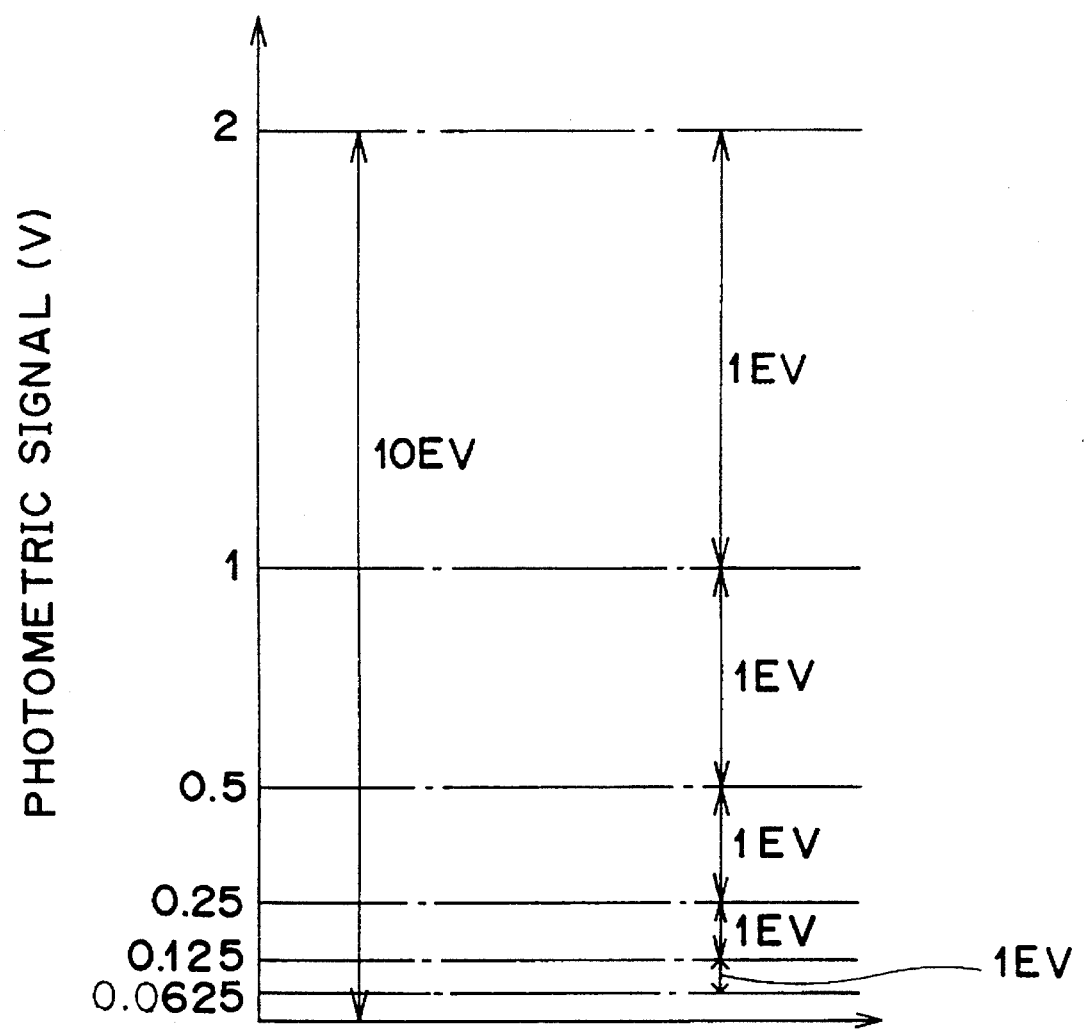
FIG. 7 is a diagram showing the relationship between a photometric output voltage and an EV value.

For example, in a photographing operation under a fluorescent lamp, the brightness of the subject field is not fixed at all times due to the effect of flicker of the fluorescent lamp, and as shown in FIG. 6, light and darkness repetitively appears at a constant period. Accordingly, the level of the photometric signal V is varied in accordance with the timing of the accumulating operation, and thus there is a possibility that no proper brightness value can be obtained in only one accumulating operation. Therefore, in this embodiment, the accumulating operation is carried out twice at a predetermined time interval, and the photometric signals V obtained in the two accumulating operations are averaged, thereby removing the effect of the flicker.

That is, if k=1 at the step S111, at a step S112 the photometric signal V is read out and stored in the memory in the same manner as the step S105, and at a step S114 it is judged whether the accumulation time t used in the photometric operation at the step S110 is smaller than the predetermined value Tf1. Tf1 represents a time for which affection of flicker is not negligible. Since the flicker's affection is not negligible when the accumulation time is shorter than the period of the flicker, Tf1 is set to 9.2 ms which is substantially an intermediate value between the flicker period of 10 ms in the 50 Hz region and the flicker period of 8.3 ms in the 60 Hz region. If the judgment at the step S114 is "NO", the second brightness value calculation mode is selected, and the process goes to a step S119. On the other hand, if the judgment at the step S114 is "YES", the process goes to a step S115.

At the step S115, it is judged in the control unit 14 whether the accumulation time t is larger than Tf2 (second predetermined time). If the judgment at the step S115 is "NO", the second brightness value calculation mode is selected, and the process goes to the step S119. If the judgment at the step S115 is "YES", the first brightness value calculation mode is selected, and the process goes to a step S116. The reason for the judgment at the step S115 is as follows.

Under artificial illumination such as fluorescent lamp or the like, the brightness value is about EV14 at maximum, that is, illuminance on the light-receiving device is about 1561× at maximum. Therefore, when there is a brightness value which is larger than the above maximum value, the illumination may be considered as being based on natural light from the sun or the like. Accordingly, when the accumulation time t is shorter than the accumulation time for a photometric operation of brightness of about 1561× on the light-receiving device, there may be considered no affection of flicker. Therefore, Tf2 is set to the accumulation time 640 μs corresponding to 1561×.

At the step S116, it is judged whether k=1. If k≠1, the photometric operation has been carried out two times after the judgment at the step S115 is "YES", and thus the process goes to the step S119. If k=1, the photometric operation has been carried out only once, and thus the process goes to the step S117 to carry out the photometric operation once again. At the step S117, K is set to "0", and subsequently at a step S118 a timer (not shown) is actuated. The program awaits its operation until a time of odd times of a half of the flicker period elapses from the accumulation start time, and returns to the step S110 when the time has elapsed to start the accumulation again.

If it is judged at the step S111 that k=0, at a step S113 the photometric signal V is read out in the same manner as the step S105, and the photometric signal V and the photometric signal V obtained at the step S112 are added and averaged. The averaged value is stored in the memory again, and then the process goes to the step S114.

At a step S119, the brightness-value calculation unit 10 is actuated, and the brightness value BV(m,n) of each photometric region is calculated using the following equation on the basis of the 240 photometric signals V(m,n) obtained at the step S108, S112 or S113, the correction coefficient k (m, n) calculated on the basis of lens information from the in-lens ROM 11 and the accumulation time t input from the accumulation time setting unit 13:

$$BV(m,n) = \log(V(m,n) \cdot k(m,n)/t)/\log 2$$

(m,n) represents an address for specifying each picture element of the photoelectric conversion device 7 as shown in FIG. 2, where m represents an integer from 1 to 20 which indicates a horizontal direction, and n represents an integer of 1 to 12 which indicates a vertical direction.

At a step S119A, the exposure calculation unit 12 is actuated to calculate a proper exposure value BVans on the basis of each of the above calculated brightness values. The calculation method of BVans will be described later. At a step S120, the accumulation time setting unit 13 is started to calculate the accumulation time t for the next photometric operation and store it into a predetermined memory. This accumulation time calculation method will be described later.

If the release button (not shown) is judged to be fully pushed down a step S121, the process goes to a step S122, and the diaphragm and the shutter are driven on the basis of the above calculated proper exposure value BVans to perform the exposure control. If the release button is not fully pushed down, the process returns to the step S102 to repeat the above operation. Accordingly, in this embodiment, during the period from the half-push operation of the release button to the full-push operation thereof, the photometric operation of the photoelectric conversion device 7 is continuously carried out.

<Exposure Calculation>

Figure 4:
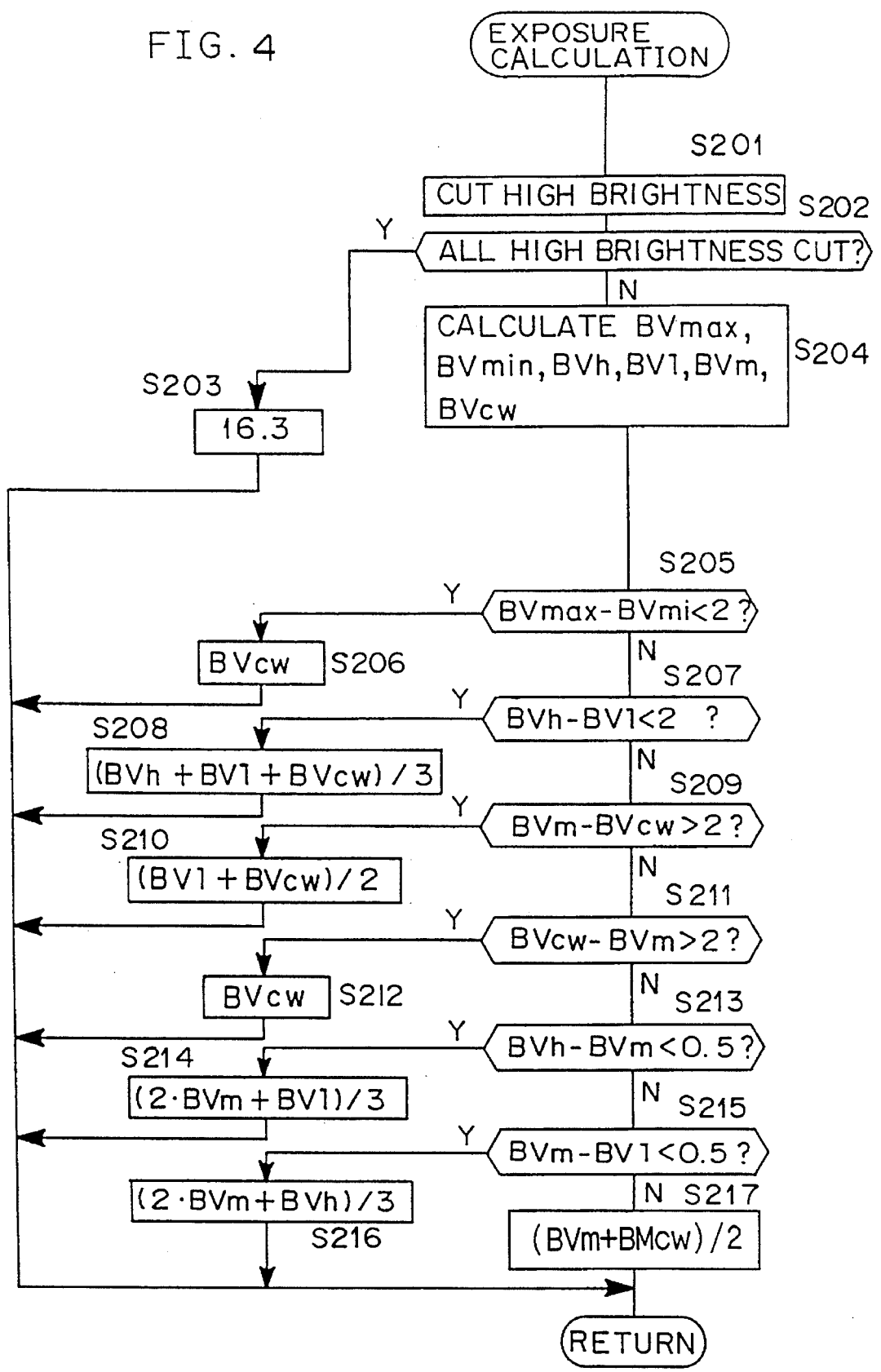
FIG. 4 is a flowchart showing an exposure calculation subroutine.

An example of the exposure calculation processing at the step S119A will be described with reference to a flowchart of FIG. 4.

At a step S201, those data which have brightness values exceeding 16.3 EV among the 240 brightness values BV (m,n) obtained in correspondence with each photometric region are replaced by 16.3 EV. When a subject having ultrahigh brightness value exceeding 16.3 EV such as the sun exists in a photographic field, the ultrahigh brightness value affects the calculation of the exposure value strongly, and thus the above operation is a countermeasure for suppressing the strong affection of the ultrahigh brightness value at maximum.

At a step S202 it is judged whether all of 240 photometric data are replaced with 16.3 EV or not. If the judgment at the step S202 is "YES", BVans is set to 16.3. If the judgment at the step S202 is "NO", at a step S204 BVmax, BVmin, BVh, BVl, BVm and BVcw are calculated from each brightness value BV(m,n). The contents of these variable are as follows.

BVmax: the maximum brightness value of 240 brightness values

BVmin: the minimum brightness value of 240 brightness values

BVh: the average brightness value of 24 brightness values which are picked up according to degree from high to low in 240 brightness values BVl: the average brightness value of 24 brightness values which are picked up according to degree from low to high in 240 brightness values BVm: the average value of all of 240 brightness values BVcw: the average brightness value of brightness values corresponding to 36 regions (as indicated by "A" in FIG. 2) of $8 \leq m \leq 13$ and $4 \leq n \leq 9$, of 240 brightness values BV(m,n)

In this embodiment, the average value of 24 brightness values is calculated to obtain BVh and BVl, however, the number of the brightness values used in averaging is not limited to 24. For example, it may be more or less than 24. Likewise, the number of the brightness values for BVcw used in averaging is not limited to 36, and it may be determined on the basis of brightness values which are located in the neighborhood of the center of the subject field.

At a step S205, it is judged whether BVmax−BVmin<2. If the judgment at the step S205 is "YES", since the difference between the maximum brightness value and the minimum brightness value is small, an object to be photographed can be regarded as having extremely flat brightness and the exposure value is similar even if the calculation thereof is made using the brightness values of any region. Therefore, at a step S206 the average brightness value BVcw of 36 brightness values corresponding to regions at the central portion which are highly reliable is substituted for the proper exposure value BVans. That is, BVans is set to BVcw.

If the judgment at the step S205 is "NO", the program goes to a step S207 to judge whether BVh−BVl<2. If the judgment at the step S207 is "YES", the difference between the brightness values of the high-brightness region and the brightness values of the low-brightness region is small and an object to be photographed can be regarded as having a substantially flat brightness, so that the proper exposure value BVans is calculated as follows at a step S208.

$$BVans=(BVh+BVl+BVcw)/3$$

If the judgment at the step S207 is "NO", the program goes to a step S209 to judge whether BVm−BVcw>2. If the judgment at the step S209 is "YES", it can be considered that the brightness value of the central portion is lower than the average brightness value, that is, the central portion is dark and the backlight situation occurs, and the proper exposure value Vans is calculated as follows at a step S210.

$$BVans=(BVl+BVcw)/2$$

If the judgment at the step S209 is "NO", the program goes to a step S211 to judge whether BVcw−BVm>2. If the judgment at the step S211 is "YES", it can be considered that the brightness value at the central portion is larger than the average brightness value, that is, the central portion is bright and an object is under a spot light. Therefore, at a step S212, the proper exposure value BVans is set to the average brightness value BVcw.

If the judgment at the step S211 is "NO", the program goes to a step S213 to judge whether Bvh−BVm<0.5. If the judgment at the step S213 is "YES", the difference between the brightness value corresponding to the high-brightness region and the average brightness value is small and an object to be photographed can be regarded as including a small dark subject in a photographic field. Accordingly, the proper exposure value BVans is calculated as follows at a step S214.

$$BVans=(2 \cdot BVm+BVl)/3$$

If the judgment at the step S213 is "NO", the program goes to a step S215 to judge whether BVm−BVl<0.5. If the judgment at the step S215 is "YES", the difference between the brightness value corresponding to the low-brightness region and the average brightness value is small and thus an object to be photographed can be regarded as including a small bright subject in a photographic field. Accordingly, the proper exposure value BVans is calculated as follows at a step S216.

$$BVans=(2 \cdot BVm+BVh)/3$$

If the judgment at the step S215 is "NO", an object to be photographed is not matched with any scene as described above, and thus it is regarded as a general scene. Accordingly, the proper exposure value BVans is calculated as follows at a step S217.

$$BVans = (BVm + BVcw)/2$$

<Calculation Method of Optimum Accumulation Time>

Figure 5:
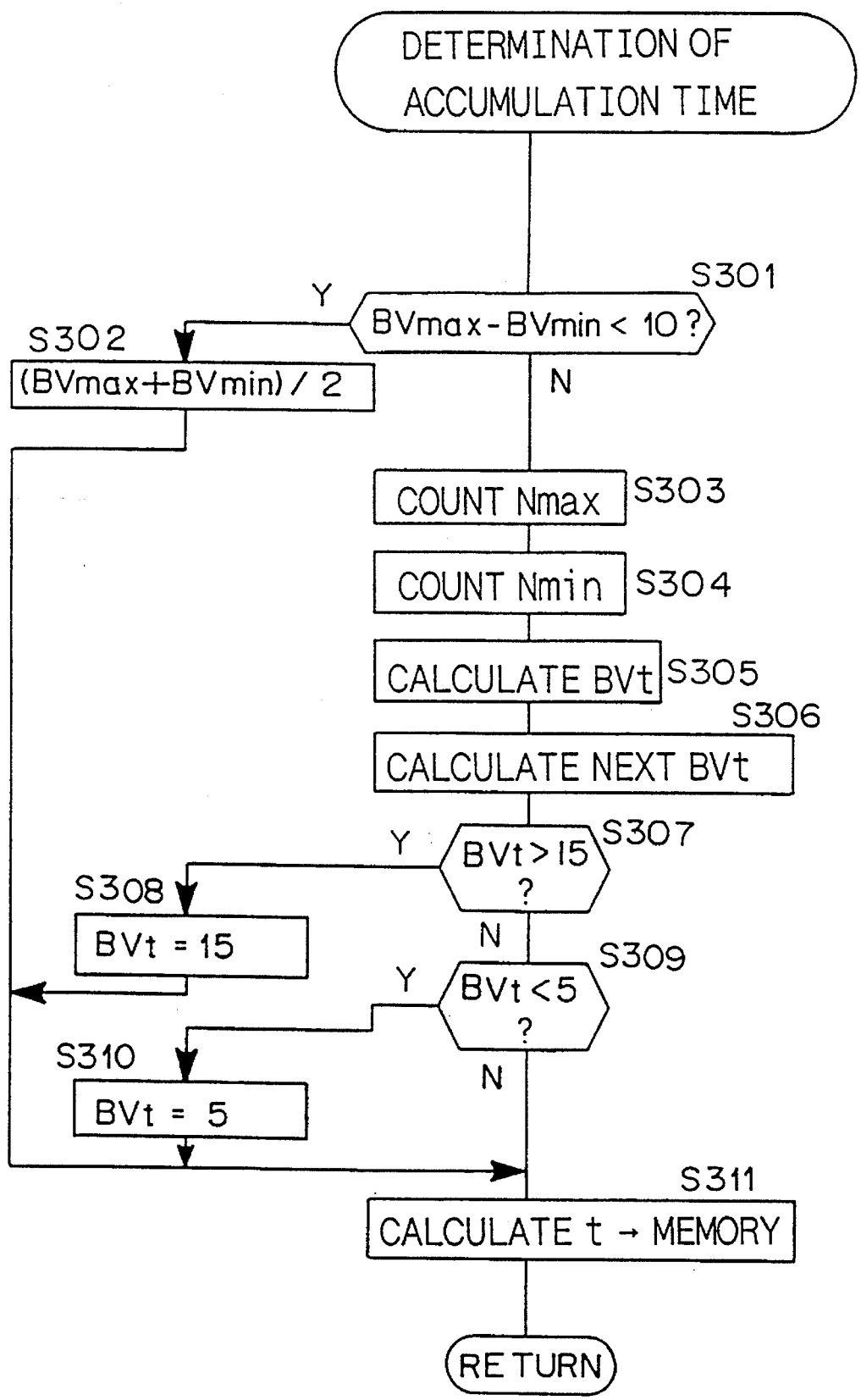
FIG. 5 is a flowchart showing an accumulation-time calculating subroutine.

FIG. 5 is a flowchart showing the details of the calculation of the accumulation time at the step S120 in FIG. 3B.

At a step S301, it is judged whether the difference between the maximum value BVmax of the 240 brightness values obtained as described above and the minimum value BVmin is within the dynamic range 10 of the photoelectric conversion device 7, that is, BVmax−VBmin<10. If the judgment at the step S301 is "Yes", all of 240 photometric signals V are regarded as being within the dynamic range of one photometric operation, and thus at the step S302 the reference level BVt of a next photometry is set to the average value of the maximum and minimum brightness values of the brightness values. That is, the photometric reference level BVt is calculated as follows:

$$BVt = (BVmax + BVmin)/2$$

The photometric reference level BVt represents the brightness value providing just a half of the saturation level of the photometric signal V obtained when the photometric operation is conducted for an accumulation time, and for example, BVt=15 when the photometric brightness range is set to EV10 to EV20. Substituting BVt into the equation used at a step S311 as described later, the accumulation time is calculated which will obtain the photometric brightness range in which the value of BVt is just a half of the saturation level.

If the judgment at the step S301 is "No", it means that a photometric signal V above the photometric upper-limit value or below the photometric lower-limit value exists in the previous photometry, and thus the number Nmax of the maximum values of the 240 brightness values obtained in the previous photometry is counted at a step S303. Like the step S303, the number Nmin of the minimum values of the 240 brightness values is counted at a step S304. At a step S305, the photometric reference level BVt in the previous photometry is calculated as follows:

$$BVt = \log(0.32/t)/\log 2$$

Here, t represents the accumulation time of the previous photometry. For example, BVt=5 for t=0.01.

Subsequently, at a step S306, the next photometric reference level BVt is calculated using the previous photometric reference level in accordance with the following equation:

$$BVt = BVt + (Nmax - Nmin)/10$$

According to this equation, the next photometric reference level BVt increases when Nmax is larger than Nmin, and inversely the next photometric reference level BVt decreases when Nmin is larger than Nmax. An increase of the photometric reference level means that the photometric brightness range is shifted to the high-brightness side, and the decreases of the photometric reference level means that the photometric brightness range is shifted to the low-brightness side. The level shift amount is optimized by multiplying the (Nmax−Nmin) by 1/10, however, any value other than "1/10" may be used as the value by which (Nmax−Nmin) is multiplied.

At a step S307 it is judged whether BVt>15. If the judgment at the step S307 is "Yes", the photometric reference exceeds the photometric upper-limit value, and thus at a step S308 the next photometric reference level BVt is set to the photometric upper-limit value of 15. At this time, the photometric brightness range is set to EV10 to EV20. If the judgment at the step S307 is "No", the process goes to a step S309 to judge whether BVt<5. If the judgment at the step S309 is "Yes", the photometric reference level is lower than the photometric lower-limit value, and thus at a step S310 the photometric reference level BVt is set to the photometric lower-limit value of 5. At this time, the photometric brightness range is set to EV0 to EV10. Further, if the judgment at the step S309 is "No", the process goes to a step S311.

At the step S311, the next accumulation time t is calculated from the value of BVt obtained at any one of the steps S302, S306, S308 and S310 in accordance with the following equation:

$$t = 0.32/2^{BVt}$$

The calculated accumulation time t is stored in the memory. The accumulation time t is an accumulation time for providing such a photometric brightness range that the value of the photometric reference level BVt as described above is equal to half of the saturation level of the photoelectric conversion device 7, and the accumulation time t is shorter as BVt is larger.

According the procedure as shown in FIG. 5, the accumulation time for the next photometry is calculated on the basis of the maximum and minimum values of the brightness values calculated from the respective photometric signals V for the 240 photometric regions. Describing in details, when the difference between the maximum value BVmax and the minimum value BVmin of the calculated brightness values is lower than the dynamic range of the photoelectric conversion device 7, the photometry can be performed for all of the photometric regions in one photometric operation. In this case, the accumulation time t is so calculated that the average value of the maximum value BVmax and the minimum value BVmin of the brightness values as described above is equal to an intermediate value of the photometric brightness range in the next photometric operation. If the photometric operation is carried out using this accumulation time t, the possibility that the brightness range of the subject field is also accommodated in the photometric brightness range of the photoelectric conversion device 7 in the next photometry becomes extremely high, and thus the proper exposure value can be more frequently calculated.

When the difference between the maximum value BVmax and the minimum value BVmin of the brightness values is above the dynamic range "10" of the photoelectric conversion device 7, that is, when brightness values above the upper-limit value of the photometric brightness range or below lower-limit value of the photometric brightness range existed in the previous photometry, the accumulation time is calculated in accordance with the number Nmax of the maximum value BVmax and the number Nmin of the minimum value BVmin. In details, if the Nmax is larger than the Nmin, it is expected that a lot of photometric regions having relatively high brightness exist, and thus the accumulation time is so calculated that the accumulation time t of the next photometry is set to be shorter than the accumulation time t of the previous photometry (the photometric brightness range is shifted to the high-brightness side). Accordingly, by conducting the photometry using this calculated accumulation time t, the possibility that at least the brightness value of the highest brightness region of the subject field exceeds the upper-limit value of the photometric brightness range of the photoelectric conversion device 7 is lowered, and the photometric operation is carried out with attaching great weight on the high-brightness side. Therefore, the possibility that the proper exposure can be calculated using the photometric signals obtained in the next photometric operation becomes high.

On the other hand, when the number Nmax of the maximum value BVmax is smaller than the number Nmin of the minimum value BVmin, it is expected that a lot of photometric regions having relatively low brightness are exist. Therefore, the accumulation time t is so calculated that the accumulation time t of the next photometry is longer than the accumulation time t of the previous photometry (the photometric brightness range is shifted to the low-brightness side). Accordingly, by conducting the photometry using the accumulation time t, the possibility that at least the brightness value of the lowest brightness region of the subject field is lower than the lower-limit value of the photometric brightness range of the photoelectric conversion device 7 becomes low, and the photometric operation is conducted with attaching great weight to the low brightness side. Therefore, the possibility that the proper exposure value can be calculated using the photometric signals obtained in the next photometric operation becomes high.

The photometric reference level BVt as described above indicates the center of the photometric brightness range. This embodiment adopts an APEX system, therefore, the center of the photometric brightness range does not correspond to the center in anti-logarithm. That is, the APEX system adopts a logarithm having bottom of "2", and for example assuming the saturation voltage of the photoelectric conversion device 7 to be 2 V, the center thereof is equal to 0.0625 V (1 V in antilogarithm).

Further, in this embodiment, both the number Nmax of the maximum value BVmax and the number Nmin of the minimum value BVmin of the brightness values are counted to calculate the photometric reference level BVt. However, only one of Nmax and Nmin may be counted. In this case, at the step S306 of FIG. 5, the photometric reference level BVt may be calculated using the following equation:

$$BVt=BVt-Nmin/10, \text{ or}$$

$$BVt=BVt+Nmax/10$$

At the step S306 as described above, in cases other than the case where (Nmax−Nmin) is equal to zero, the next photometric reference level BVt is altered at all times. However, in order to stabilize the control, the photometric reference level BVt is adjusted not to be altered if (Nmax−Nmin) is within a predetermined permitted range.

Figure 8A:
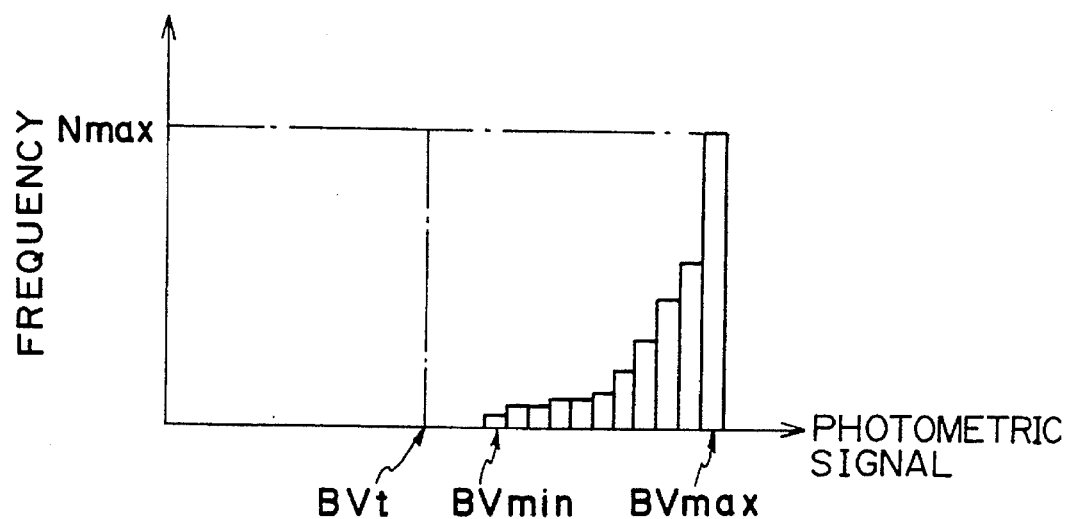
FIGS. 8A and 8B are graphs showing the frequency distribution of photometric signals.

Further, for example, in the case where Nmax≠0 and the minimum value BVmin of the brightness value is located at a relatively-high brightness side of the photometric brightness range as shown in FIG. 8A, the photometric reference level BVt may be so calculated using the following equation that the minimum value BVmin of the brightness value in the next photometric operation is in the vicinity of the lower limit of the photometric brightness range:

$$BVt=BVmin+5$$

Figure 8B:
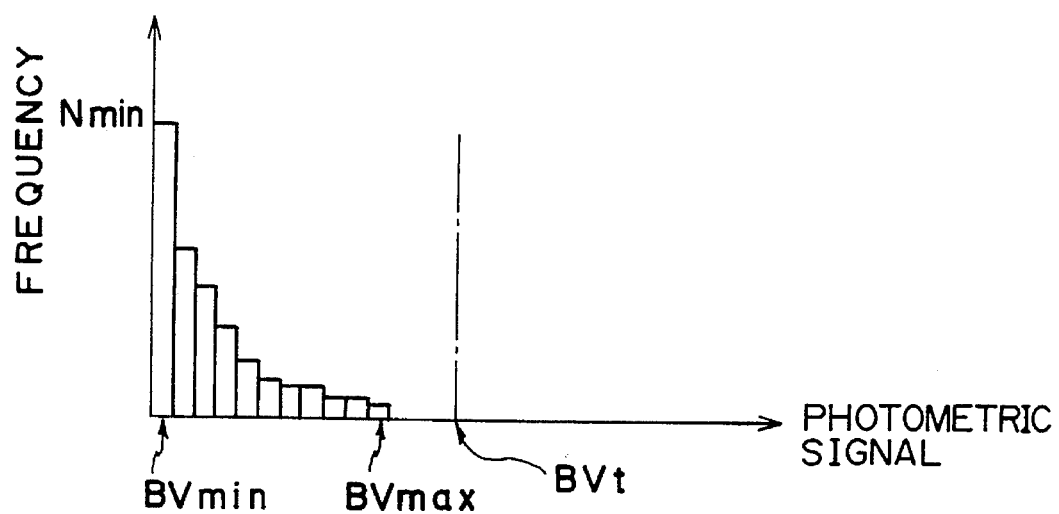
Figure 9A:
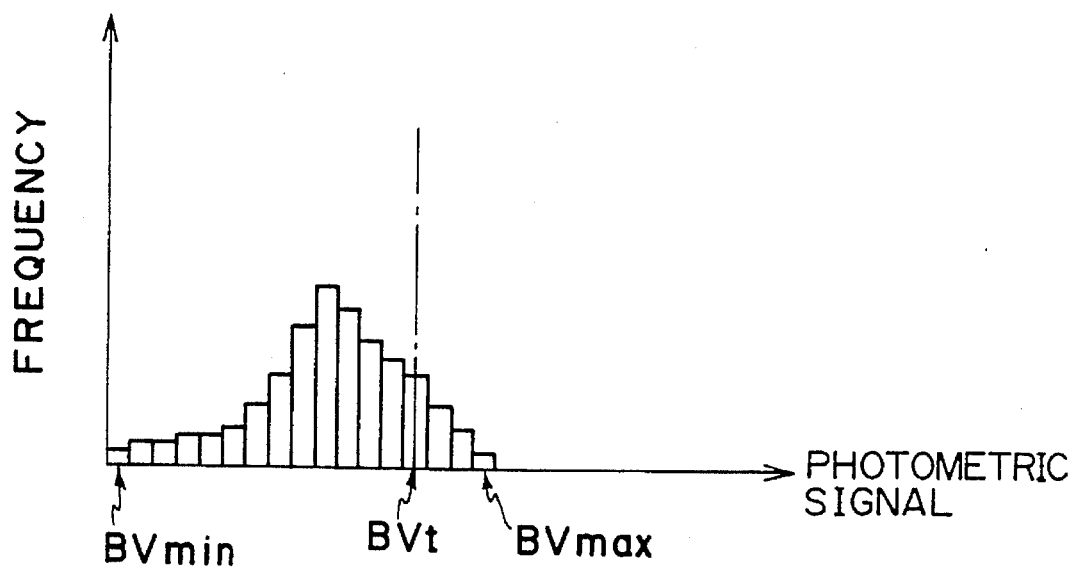
FIGS. 9A and 9B are graphs showing the frequency distribution of photometric signals.

Through this calculation, in the next photometric operation, a frequency distribution as shown in FIG. 9A is obtained in the next photometry. Likewise, in the case where Nmin≠0 and the maximum value BVmax of the brightness value is located at a relatively-low brightness side of the photometric brightness range as shown in FIG. 8B, the photometric reference level BVt may be so calculated using the following equation that the maximum value BVmax of the brightness value is in the vicinity of the upper limit of the photometric brightness range:

$$BVt=BVmax-5$$

Figure 9B:
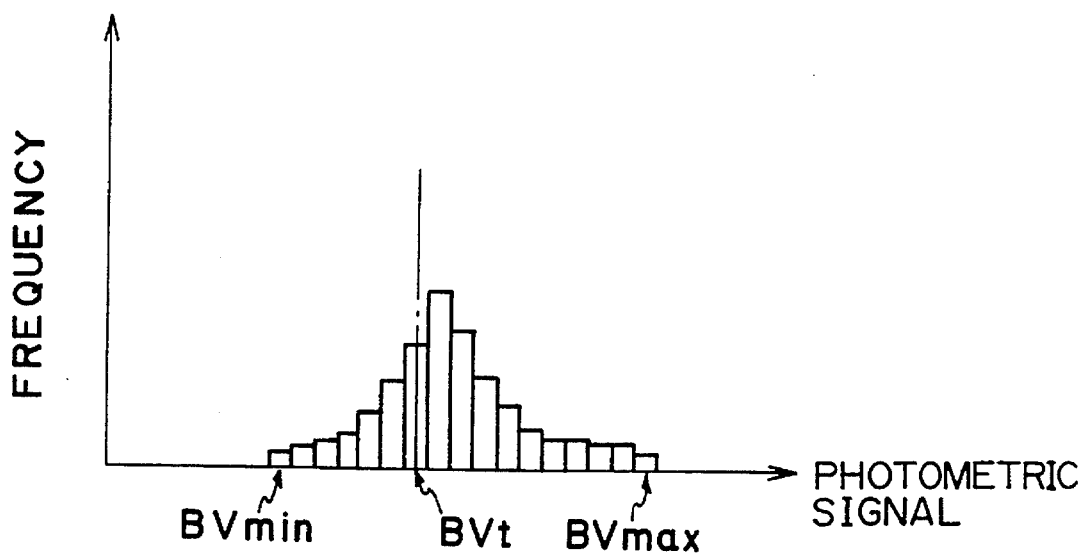

Through this calculation, a frequency distribution as shown in FIG. 9B is obtained in the next photometric operation.

Here, "5" which is a constant term of the right side of the above equation is introduced to shift BVmin or BVmax to the lower limit or upper limit of the photometric brightness range.

Second Embodiment

A second embodiment according to this invention will be next described with reference to FIGS. 10 to 13D.

In this second embodiment, the low-brightness side photometry in which the photoelectric conversion device 7 is actuated using the relatively-long accumulation time and the high-brightness side photometry in which the photoelectric conversion device 7 is actuated using the relatively-short accumulation time are alternately carried out to calculate the brightness value on the basis of the low-brightness side photometric signal obtained by the low-brightness side photometry and the high-brightness side photometric signal obtained by the high-brightness side photometry. Further, on the basis of each photometric signal as described above, the low-brightness side accumulation time and the high-brightness side accumulation time are set to proper values in the next photometry.

The constructions of the optical system and the control system of this embodiment are identical to those of FIG. 1, and only the control operation of the control circuit 100 is different from that of the first embodiment.

The control operation will be hereunder described with reference to the flowcharts shown in FIGS. 10 to 12.
<Main Algorithm>

Figure 10:
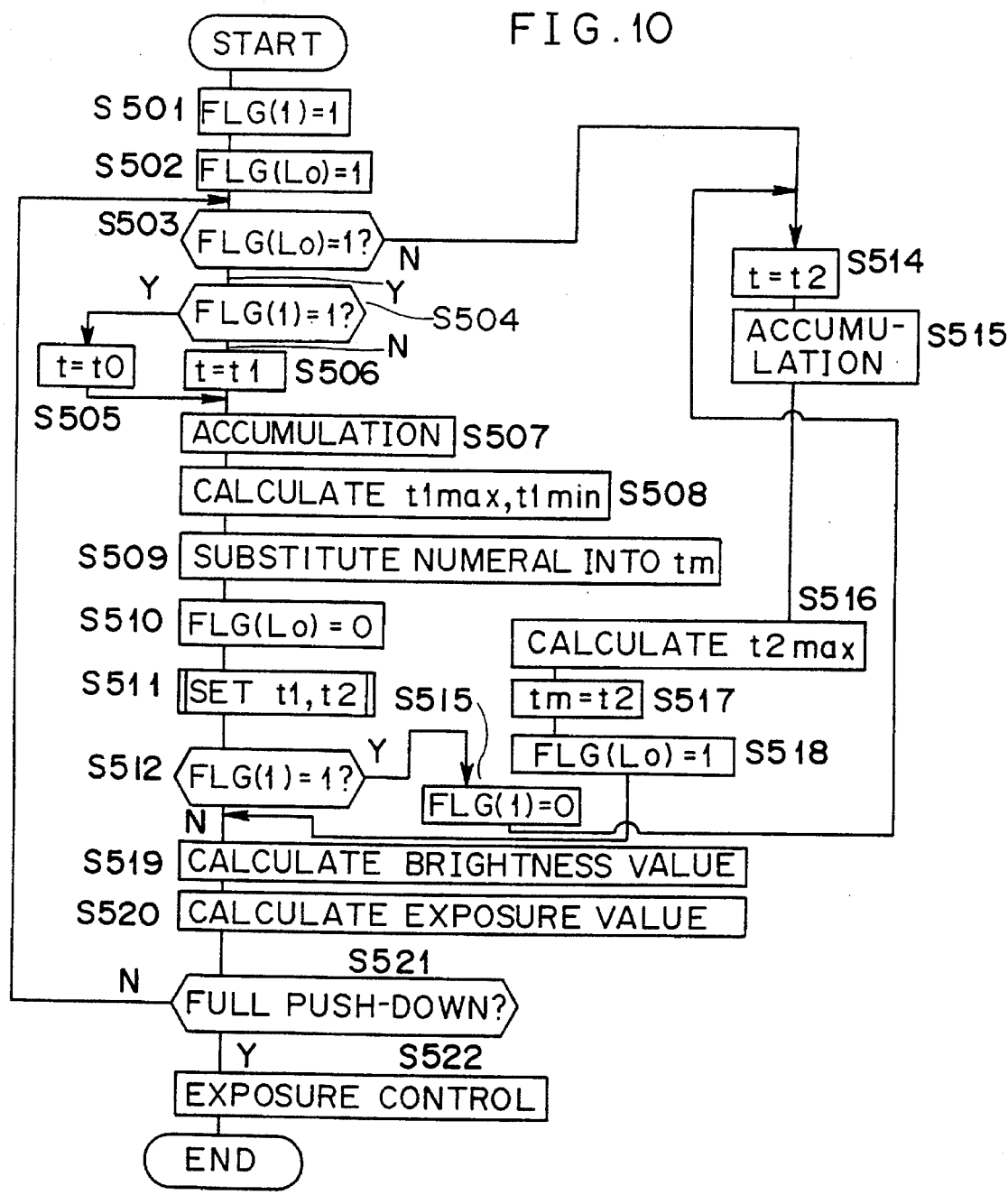
FIG. 10 is a flowchart showing a main algorithm in a second embodiment of this invention.

FIG. 10 is a flowchart showing the main algorithm. This program is executed upon the half-push manipulation of the release button as not shown, for example. At a step S501, a flag FLG(1) is initially set to "1". This flag FLG(1) is used to judge whether a photometry to be next conducted is a first photometry after the release button is half pushed. FLG(1)=1 indicates the first photometry, and FLG(1)≠1 indicates the second or subsequent photometric operation. At a step S502, the flag FLG(Lo) is initially set to "1". This flag FLG(Lo) is used to judge whether the photometry to be next conducted is the low-brightness side photometry or the high-brightness side photometry. FLG(Lo)=1 indicates the low-brightness side photometry, and FLG(Lo)≠1 indicates the high-brightness side photometry. In this embodiment, the low-brightness side photometry is carried out first and thus FLG(Lo)=1 at the step S502.

At a step S503, it is judged whether FLG(Lo)=1, that is, whether the next photometry is the low-brightness side photometry. If FLG(Lo)=1, the process goes to a step S504. At a step S504, it is judged whether FLG(1)=1, that is, whether the photometry is the first one. If FLG(1)=1, the process goes to a step S505. At the step S505, the accumulation time t is set to an initial value t0(=40 ms).

Here, as described above, the photoelectric conversion device 7 of this embodiment can conduct the photometry in the range of EV0 to EV10 for t=10 ms, and thus the accumulation time t0 when the low-brightness side photometry as described above is conducted should be originally set to 10 ms. However, in consideration of a dark current occurring from the photoelectric conversion device 7 or noises of circuits, t0 is set to 40 ms. That is, if the dark current and the noises are contained in the photometric signal, the occupation rate of the noise components in the photometric signal is larger as the A/D conversion value of the photometric signal is smaller (the subject field is darker), so that the photometric accuracy is lowered. Accordingly, the photometric range is shifted to a slightly higher brightness side than the lower-limit value so that the value of the obtained photometric signal is made large, then the occupation rate of the noise components is reduced.

If FLG(1)≠1 at the step S504, that is, if the photometry is judged to be the second or subsequent one, at a step S506, a time t1 stored in a memory (not shown) is read out, and this time is set as the accumulation time t.

At a step S507, the accumulating operation of the photoelectric conversion device 7 is actuated using the set accumulation time t, and the photometric signal V(m,n) output from the A/D conversion unit 9 is input. The resolution of the A/D conversion unit 9 is set to 10 bits, and thus the range of the photometric signal V(m,n) is in the range of 0 to 1023.

At a step S508, the maximum value t1max and the minimum value t1min of 240 photometric signals V(m,n) obtained at the step S507 are calculated. At a step S509, the accumulation time when the photometry is carried out at the step S507 is stored into a variable tm. At a step S510, the flag FLG(Lo) is set to "0". At a step S511, the next low-brightness side accumulation time t1 and the high-brightness side accumulation time t2 are calculated. The process of the step S511 will be later described in detail.

At a step S512 it is judged whether FLG(1)=1. If FLG(1)= 1, the photometry to be next conducted is judged to be a high-brightness side photometry, and the process goes to a step S513. At the step S513, the flag FLG(1) is set to "0". Subsequently, at a step S514, the high-brightness side accumulation time t2 is read out from the memory to set the accumulation time t. The high-brightness side accumulation time t2 is a value obtained in the process of the step S511 as described later. At a step S515, like the step S507, the accumulating operation, that is, the high-brightness side photometry by the photoelectric conversion device 7 is carried out using the set accumulation time t. At a step S516, the maximum value t2max of the 240 photometric signals V(m,n) obtained at the step S515 is calculated. At a step S517, the photometric time t2 when the photometry is conducted at the step S515 is stored into tm. At a step S518, the flag FLG(Lo) is set to "1", and then the process goes to a step S519.

At the step S519, on the basis of the 240 phonetic signals V(m,n) obtained at the step S107 or S115, the brightness values of the 240 photometric regions of the subject field are calculated. The calculation control for these brightness values will be later described in detail. At a step S520, the exposure value is calculated on the basis of the brightness values obtained at the step S519 in the same procedure as shown in FIG. 4. At a step S521 it is judged whether the release button as not shown is fully pushed. If the release button is judged not to be fully pushed, the process returns to the step S503 to repeat the above operation. If the release button is judged to be fully pushed, the exposure control is conducted at a step S522. That is, on the basis of the calculated exposure value as described above, the diaphragm and the shutter (not shown) are driven to perform a photographing operation.

According to the procedure as shown in FIG. 10, following the half-push operation of the release button, the first photometry (low-brightness side photometry) of the photoelectric conversion device 7 is conducted using the beforehand-set low-brightness side accumulation time t0, and subsequently the second photometry (high-brightness side photometry) is conducted using the high-brightness side accumulation time t2. Subsequently, the low-brightness side photometry and the high-brightness side photometry are alternately and continuously conducted until the release button is fully pushed. Further, prior to each photometric operation, the low-brightness side accumulation time t1 and the high-brightness side accumulation time t2 are calculated by the accumulating operation setting unit 13, and further the brightness value calculation processing and the exposure value calculation processing are conducted every time each photometric operation is terminated.

<Accumulation-time Setting Processing>

FIG. 11 shows the detailed procedure for the accumulation-time setting processing of the step S511 as described above.

In FIG. 11, at a step S601, it is judged whether the maximum value t1max of the 240 photometric signals V(m,n) obtained in the low-brightness side photometry is equal to "1023", that is, whether the photometric signal of the highest brightness region in the subject field is equal to the upper-limit value of the A/D convertible range in the low-brightness side photometry. If t1max≠1023, as shown by (1) of FIG. 13A, the photometric signal for the highest brightness region in the subject field is judged to be lower than the upper-limit value of "1023" of the A/D convertible range, that is, the brightness of the highest brightness region is judged to be accommodated in the photometric brightness range in the current photometry, and the next low-brightness side accumulation time t1 is calculated using the following equation at a step S602:

$$t1 = t1 \times 1023/t1max$$

Figure 13A:
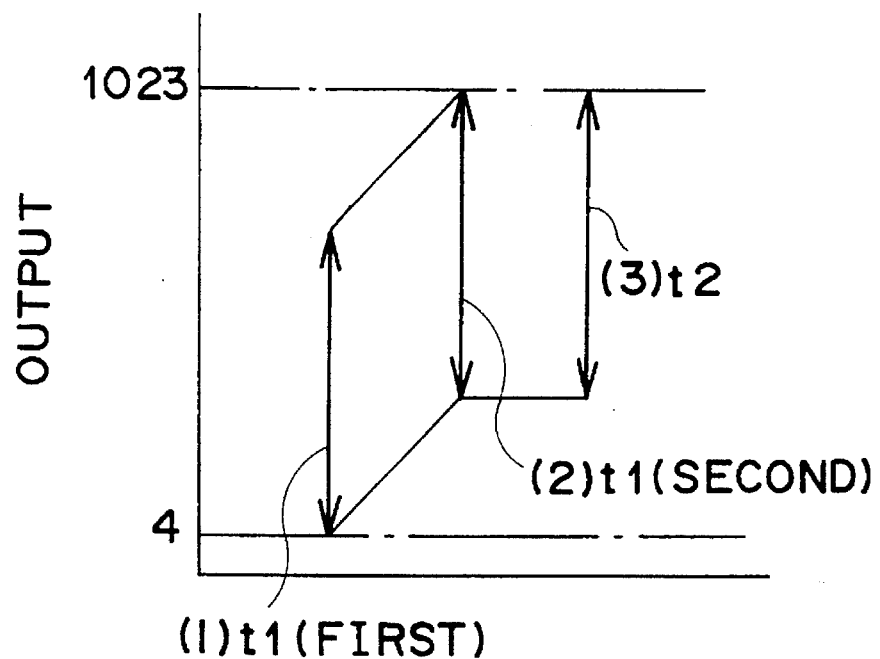
FIGS. 13A to 13D are graphs showing a method of calculating an accumulation time.

According to this equation, the maximum value t1max of the presently-obtained low-brightness side photometric signal is equal to the upper-limit value "1023" of the A/D convertible range in the next low-brightness side photometry, that is, the distribution of the photometric signals corresponds to a state as shown by (2) of FIG. 13A. By setting the next low-brightness side accumulation time t1 as described above, the photometry for a lower brightness side can be further carried out in the next low-brightness side accumulation, so that the photometric brightness range can be substantially broadened.

Next, at a step S603, the high-brightness side accumulation time t2 is calculated using the following equation:

$$t2 = t1$$

That is, when the brightness of the highest brightness region is within the photometric brightness range in the low-brightness side photometry, the photometric brightness range in a high-brightness side photometry to be next carried out may be also identical to that of the low-brightness side photometric operation as shown by (3) of FIG. 13A, and thus the high-brightness side accumulation time t2 is set to be equal to the accumulation time t1 of the low-brightness side. Thereafter, the process is returned to FIG. 10.

On the other hand, if it is judged at the step S601 that t1max=1023, that is, the photometric signal for the highest brightness region in the subject field is equal to the upper-limit value "1023" of the A/D convertible range, the brightness of the highest brightness region exceeds the photometric brightness range in the low-brightness side photometry as described above as shown in by (4) of FIG. 13B. In this case, it is required that the high-brightness side accumulation time t2 is set to be shorter than the low-brightness side accumulation time t1 so a photometry for a higher brightness side can be conducted. Accordingly, the process goes to a step S604 to judge whether t1min<4. That is, since it is considered that as the A/D conversion value of the photometric signal is smaller, reliability of the value is lower due to the dark current of the photoelectric conversion device 7 or the noises of the circuits as described above, it is judged at the step S604 whether the photometric signal at the darkest region is such a large value as to be reliable. Through the judgment, if the A/D conversion value is above "4", that is, the state as shown by (4) of FIG. 13B is judged, it is judged that the occupation rate of the noise components in the A/D conversion value is low and thus the photometric signal is a reliable value, and the next low-brightness side accumulation time t1 is calculated using the following equation:

$$t1=t1\times 4/t1min$$

Figure 13B:
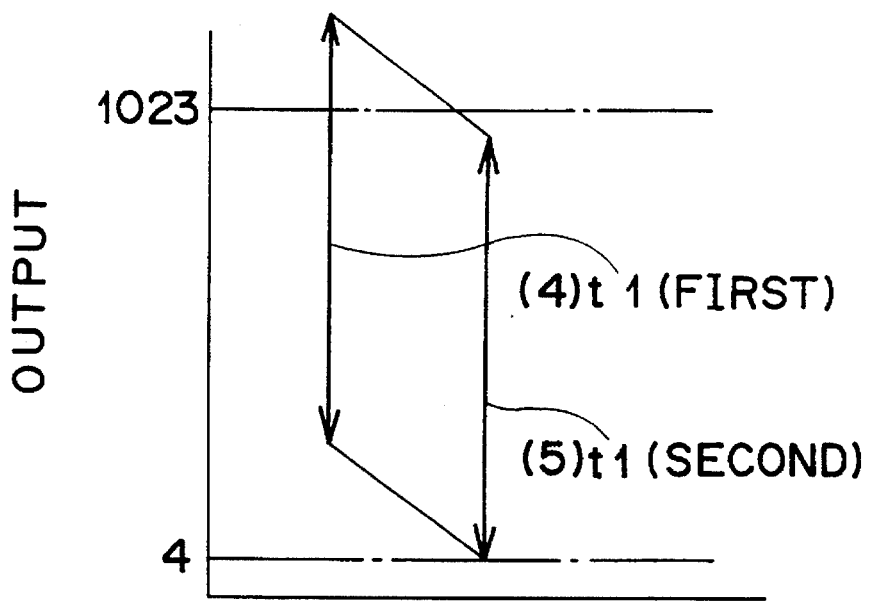
Figure 13C:
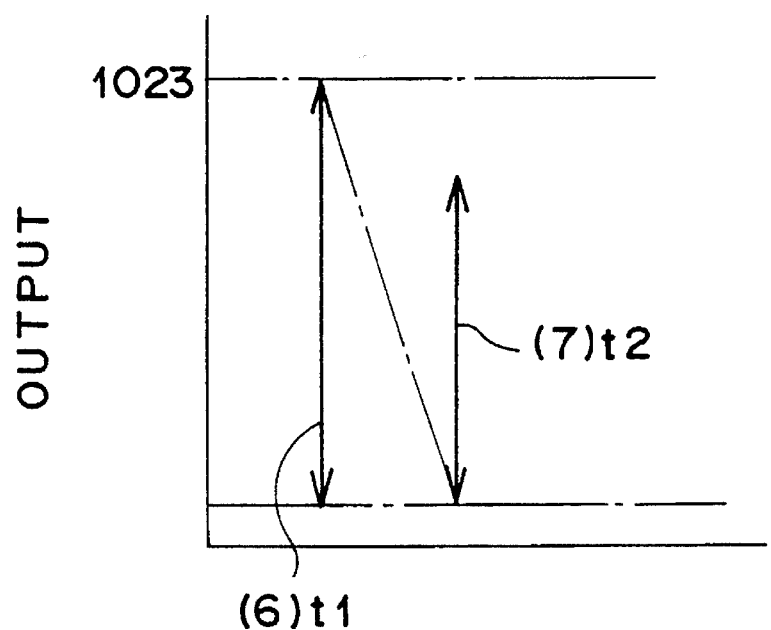

According to this equation, the next low-brightness side accumulation time t1 is set so that the minimum value t1min of the photometric signals is equal to just "4" (the minimum value of reliable values) as shown by (5) and (6) of FIGS. 13B and 13C. By setting the next low-brightness side accumulation time t1 as described above, the photometry can be conducted on a higher brightness side in the next low-brightness side photometric operation without inducing reduction of photometric accuracy due to the dark current or the noises as described above, and thus the photometric brightness range can be substantially broadened. Thereafter, the process goes to a step S609.

On the other hand, If t1min<4 is judged at the step S604, that is, if the occupation rate of the noise components in the photometric signal is large and reliability to the value of the photometric signal is low, the process goes to a step S605. At the step S605, the next low-brightness side accumulation time t1 is calculated using the following equation:

$$t1=t1\times 2$$

That is, the accumulation time of the next low-brightness side is set to be twice as much as the previous accumulation time to shift the photometric brightness range to the low-brightness side. Through this operation, for the same brightness, the photometric signal which will be obtained in the next photometric operation will be larger than the photometric signal obtained in the current photometric operation. Therefore, the occupation rate of the noise components is reduced, reliability of the photometric signal is improved, and the reduction of photometric accuracy due to the dark current or the noises can be suppressed to the minimum.

Next, at a step S606, it is judged whether the low-brightness side accumulation time t1 exceeds 100 msec. For t1>100 msec, it takes an excessively long time for the photometry if the accumulation time is further lengthened, so that the accumulation time t1 is limited to 100 msec at a step S607. For t1≦100 msec, the process skips the step S607, and goes to a step S609.

Subsequently, at the step S609, it is judged whether FLG(1)=1. If FLG(1)=1, that is, the current photometric operation is the first photometric operation, no photometric signal at the high-brightness side has yet been obtained, and the next high-brightness side accumulation time t2 is calculated using the following equation at a step S610:

$$t2=t1/256$$

According to this equation, the next high-brightness side accumulation time t2 is set so that the minimum value of the next high-brightness side photometric signals is equal to the upper-limit value of the A/D convertible range of the next low-brightness side photometry. Accordingly, the photometry can be efficiently and continuously carried out from the low-brightness side to the high-brightness side.

If at the step S609 it is judged that FLG(1)≠1, that is, the photometry is the second or subsequent one, the high-brightness side photometric signal has been obtained, then at a step S611 it is judged whether t2max=1023. If t2max=1023, the high-brightness side photometric signal for the highest brightness region in the subject field is judged to be equal to the upper-limit value "1023" of the A/D convertible range, that is, the brightness of the highest brightness region is judged to exceed the photometric brightness range in the highest brightness side photometry, and the process goes to a step S610. That is, the next high-brightness side accumulation time t2 is set so that the minimum value of the next high-brightness side photometric signals is equal to the upper-limit value of the A/D convertible range in the next low-brightness side photometry. Through this operation, the photometric operation can be efficiently and continuously carried out from the low-brightness side to the high-brightness side.

Figure 13D:
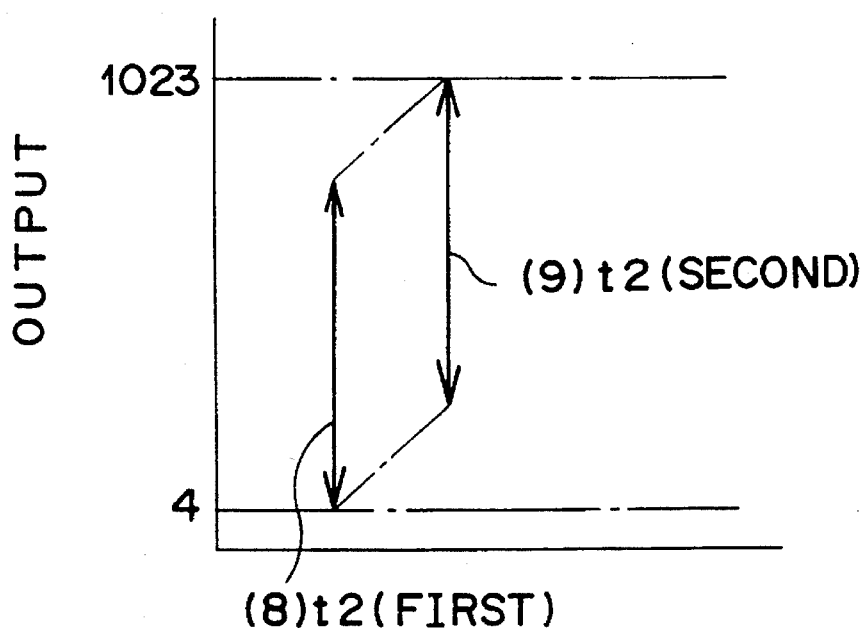

If t2max≠1023, as shown by (8) of FIG. 13D, the high-brightness side photometric signal for the highest brightness region in the subject field is judged to be lower than the upper-limit value "1023" of the A/D convertible range, that is, the brightness of the highest brightness side photometric signal is judged to be within the photometric brightness range of the above high-brightness side photometry, and the next high-brightness side accumulation time t2 is calculated using the following equation at a step S612:

$$t2=t2\times 1023/t2max$$

According to this equation, the next high-brightness side accumulation time t2 is set so that the maximum value of the next high-brightness side photometric signals is equal to the upper-limit value of the A/D convertible range in the present high-brightness side photometry. By setting the next high-brightness side accumulation time t2 as described above, the photometry for a lower brightness side can be carried out in the next high-brightness side photometric operation, and thus the photometric brightness range can be substantially broadened.

<Brightness-value Calculation Processing>

FIG. 12 shows the details of the brightness-value calculation processing at the step S519 of FIG. 10.

At a step S701, m and n are set to "1" and "1", respectively. As described above, each of m and n is a variable representing an address of each picture element of the light-receiving and accumulating unit 71 (an address of each photometric region of a subject field). At a step S702, it is judged whether t1=t2, that is, the low-brightness side accumulation time is equal to the high-brightness side accumulation time. If t1=t2, at a step S703, a flag FLG (BV) is set to "1". Here, the flag FLG(BV) is a flag for identifying whether the brightness of a region at an address (m,n) of the subject field will be calculated. If FLG(BV)=1, the brightness value will be calculated at a step S712 as described later. On the other hand, if FLG(BV)=0, no brightness value will be calculated. After the step s703, the process goes to a step S711.

On the other hand, if t1≠t2 at the step S702, the process goes to a step S704 to judge whether FLG(Lo)=1. If FLG(Lo)=1, the current state is judged to be the state immediately after the high-brightness side photometry is carried out, and the process goes to a step S708. If FLG(L0)≠1, the current state is judged to be the state immediately after the low-brightness side photometric operation is carried out, and the process goes to a step S705.

At the step S705, it is judged whether V(m,n) which is the low-brightness side photometric signal (A/D converted value) at the (m,n) address is equal to "1023". If V(m,n)=1023, that is, the possibility that the brightness of the region at the (m,n) address exceeds the photometric brightness range in the current low-brightness side photometry is high, the brightness value of the region will be calculated immediately after the next high-brightness side photometric operation is carried out, and at a step S706 FLG(BV) is set to "0". On the other hand, if V(m,n)≠1023, that is, the brightness of the region at the (m,n) address is within the photometric brightness range of the current low-brightness side photometric operation, at a step S707, FLG(BV) is set to "1" to calculate the brightness value at the region.

Further, at a step S708, it is judged whether V(m,n) which is a high-brightness side photometric signal at the (m,n) address is above "4". If V(m,n)<4, that is, reliability of the photometric signal for the region at the (m,n) address is significantly low, the brightness value at the region will be calculated immediately after the next low-brightness photometric operation is carried out, and at a step S710 FLG(BV) is set to "0". On the other hand, if v(m,n)≧4, that is, reliability of the photometric signal for the region at the (m,n) address is sufficiently high, at the step S709 FLG(BV) is set to "1" to calculate the brightness value of the region.

Subsequently to the steps S706, S707, S709 and S710, the process goes to a step S711 to judge whether FLG(BV)=1. If FLG(BV)=1, at the step S712 the brightness value BV(m,n) is calculated in accordance with the following equation, and then stored in a memory as not shown:

$$BV(m,n)=\log (V(m,n) \cdot k(m,n)/t)/\log 2$$

Here, k(m,n) represents a correction coefficient which is calculated on the basis of lens information from the in-lens ROM 11 as described above. t represents the accumulation time at the photometry just before, and it is the value stored as tm at the step S517 or S109 as shown in FIG. 10.

When the brightness value BV(m,n) calculated as described above is stored into a memory, the value which has been stored as BV(m,n) is erased. That is, at this step S312, the brightness value BV(m,n) is renewed. After the step S712, the process goes to a step S713.

On the other hand, if FLG(BV)=0 at the step S711, the process skips the step S712 and goes to the step S713. That is, if FLG(BV)=0, no brightness value is calculated (renewed), and the value which has been stored as BV(m,n) up to now remains without alteration. At the step S713, it is judged whether m=20. If m≠20, at a step S714, m is counted up by "1", and then the process returns to the step S702. If m=20, the process goes to a step S715. At the step S715, it is judged whether n=12. If n≠12, at a step S716, m is set to "1" and n is counted up by "1", and then the process returns to the step S702. If n=12 at the step S715, the process is judged to be conducted on all regions of the subject field, and the process is returned to the process of FIG. 10.

According to the procedure as described above, in the case where the process as shown in FIG. 12 is conducted immediately after the low-brightness side photometry is carried out, the brightness value is calculated using only the photometric signals which are lower than the upper-limit value "1023" of the A/D convertible range to renew the brightness value. On the other hand, for the photometric signals which are equal to the upper-limit value "1023", the possibility that they exceed the photometric brightness range of the photoelectric conversion device 7 is judged to be high, so that no brightness value is calculated. In other words, in the case where the brightness of a region in the subject field is surely accommodated in the photometric brightness range in the low-brightness side photometry, reliability of the photometric signal for the region is judged to be high, and thus the brightness value is renewed on the basis of the photometric signal. If the possibility that the brightness of a region exceeds the photometric brightness range is judged to be high, reliability of the photometric signal for the region is judged to be low, so that no brightness value is renewed.

On the other hand, in the case where the process as shown in FIG. 12 is conducted immediately after the high-brightness side photometric operation is carried out, the brightness value is calculated and renewed using only the photometric signals above the predetermined value "4" of all high-brightness side photometric signals obtained in the above high-brightness side photometry. For the photometric signals which are lower than the value "4", reliability of these signals is judged to be low because they contain a number of noise components, so that no brightness value is renewed.

According to this embodiment as described above, during the period from the start of the half-push operation of the release button to the full-push operation of the release button, the low-brightness side photometry and the high-brightness side photometry are alternately carried out, and the brightness value is calculated and renewed every time each photometry is carried out. The brightness-value calculation as described above is conducted on those photometric signals which have high reliability of all photometric signals obtained in the low-brightness side photometry or the high-brightness side photometry, and thus the accurate brightness value can be calculated at all times.

The accumulation times t1 and t2 in each photometry are successively calculated such that the photometric brightness range is substantially broadened as much as possible without reducing reliability of the photometric signals as described with reference to FIG. 11, so that the brightness value of the whole subject field can be obtained through the minimum number of photometry even when the photoelectric conversion device having small dynamic range is used like this embodiment. Accordingly, the accurate exposure value can be calculated even when the brightness difference of the subject field is large.

Further, in this embodiment, the exposure value is calculated every time each photometry is terminated, so that a shutter release operation can be more immediately performed through the full-push operation of the release button in comparison with a case where the exposure value is not calculated unless both of the low-brightness side photometry and the high-brightness side photometry are carried out.

The divisional manner of the photoelectric conversion device 7 is not limited to the embodiments of this invention, and the divisional number may be lower than 240 or may be above 241. Further, an the process of the exposure calculation as shown in FIG. 4 is representatively used, and another method may be used to conduct the exposure calculation. In the second embodiment, the calculation method of the accumulation time is not limited to the method as shown in FIG. 11 insofar as the low-brightness side photometry having relatively-long accumulation time and the high-brightness side photometry having relatively-short accumulation time are carried out. Further, electric charge-accumulation type of photoelectric conversion device other than a CCD may be used as the photometric device.

I claim:

1. A photometric control device for a camera comprising:

an electric charge-accumulation type of photoelectric conversion device having plural picture elements for photoreceiving and photoelectrically converting a flux of lights from plural regions of a subject field and outputting the respective photoelectric conversion outputs as photometric signals for exposure value calculation;

accumulation time calculating means for calculating an accumulation time for a next operation of said photoelectric conversion device using both a number of maximum values of the photometric signals from said photoelectric conversion device and a number of minimum values of the photometric signals from said photoelectric conversion device; and control means for actuating said photoelectric conversion device for the calculated accumulation time.

2. The photometric control device as claimed in claim 1, further comprising brightness-value calculating means for calculating the brightness value of each region of the subject field on the basis of the accumulation time of said photoelectric conversion device and each photometric signal from said photoelectric conversion device which has been driven for said accumulation time concerned, wherein, said accumulation time calculating means calculates the accumulation time using both the number of maximum brightness values and the number of minimum brightness values.

3. The photometric control device as claimed in claim 1, wherein said control means repetitively actuates said photoelectric conversion device when a photometry instruction is being output from photometry instructing means.

4. The photometric control device as claimed in claim 2, wherein said accumulation time calculating means includes first calculating means for counting the number of brightness values equal to the upper-limit value when the maximum value is equal to the upper-limit value of a photometric brightness range of said photoelectric conversion device, and calculating an accumulation time for a next operation of said photoelectric conversion device on the basis of the number of maximum values which are counted.

5. The photometric control device as claimed in claim 2, wherein said accumulation time calculating means includes second calculating means for counting the number of brightness values equal to the lower-limit value when the minimum value is equal to the lower-limit value of a photometric brightness range of said photoelectric conversion device, and calculating an accumulation time for a next operation of said photoelectric conversion device on the basis of the number of minimum values which are counted.

6. The photometric control device as claimed in claim 2, wherein said accumulation time calculating means calculates the accumulation time for a next operation of said photoelectric conversion device so that the average value of the maximum and minimum values of the brightness values is equal to a median value of the photometric brightness range for the next operation of said photoelectric conversion device.

7. The photometric control device as claimed in claim 4, wherein said accumulation time calculating means includes first count means for counting the number of brightness values equal to the upper-limit when the maximum value of the brightness values is equal to the upper-limit value of a photometric brightness range of said photoelectric conversion device, and second count means for counting the number of brightness values equal to the lower-limit when the minimum value of the brightness values is equal to the lower-limit value of the photometric brightness range of said photoelectric conversion device, and calculates the accumulation time for a next operation of said photoelectric conversion device on the basis of each count value by said first and second count means.

8. The photometric control device as claimed in claim 7, wherein said accumulation time calculating means sets the accumulation time for the next operation of said photoelectric conversion device to be shorter than that for the current operation of said photoelectric conversion device when the count value of the maximum value of the brightness values is larger than the count value of the minimum value of the brightness values, and sets the accumulation time for the next operation of said photoelectric conversion device to be longer than that for the current operation of said photoelectric conversion device when the count value of the maximum value of the brightness values is smaller than the count value of the minimum value of the brightness values.

9. The photometric control device as claimed in claim 8, wherein said accumulation time calculating means calculates and sets the accumulation time for the next operation of said photoelectric conversion device so that the average value of the maximum and minimum values of the brightness values is equal to the median value of the photometric brightness range for the next operation of said photometric conversion device in a case where the difference between the maximum and minimum values of the brightness values is smaller than a predetermined value, and sets the accumulation time for the next operation of said photoelectric conversion device to be shorter than the accumulation time for the current operation of said photoelectric conversion device in a case where the difference between the maximum and minimum values of the brightness values is above the predetermined value, and where the count value of the maximum value of the brightness values is larger than the count value of the minimum value of the brightness values, and to be longer than the accumulation time for the current operation of said photoelectric conversion device in a case where the difference between the maximum and minimum values of the brightness values is above the predetermined value, and where the count value of the maximum value is smaller than the count value of the minimum value.

10. A photometric control device for a camera comprising:

an electric charge-accumulation type of photoelectric conversion device having plural picture elements for photoreceiving and photoelectrically converting a flux of lights from plural regions of a subject field and outputting the respective photoelectric conversion outputs as photometric signals for exposure value calculation;

accumulation time calculating means for calculating a low-brightness side accumulation time to conduct a photometry on a low-brightness side through said photoelectric conversion device, and calculating a high-brightness side accumulation time shorter than the low-brightness side accumulation time to conduct a photometry on a high-brightness side; and control means for actuating said photoelectric conversion device on the basis of the low-brightness side accumulation time calculated by said accumulation time calculating means to conduct the low-brightness side photometry, and actuating said photoelectric conversion device on the basis of the high-brightness side accumulation time calculated by said accumulation time calculating means to conduct the high-brightness side photometry.

11. The photometric control device as claimed in claim 10, further comprising brightness value calculating means for calculating the brightness value on the basis of a low-brightness side photometric signal output from said photoelectric conversion device in the low-brightness side photometry, and a high-brightness side photometric signal output from said photoelectric conversion device in the high-brightness side photometry.

12. The photometric control device as claimed in claim 10, wherein said control means controls the driving of said photoelectric conversion device so that the low-brightness side photometry and the high-brightness side photometry are alternately and repetitively carried out when a photometric instruction is being output from photometry instructing means.

13. The photometric control device as claimed in claim 12, wherein said accumulation time calculating means calculates and sets the low-brightness side accumulation time for a next low-brightness side photometry and the high-brightness side accumulation time for a next high-brightness side photometry respectively on the basis of the low-brightness side photometric signal output from said photoelectric conversion device in the low-brightness side photometric operation and the high-brightness side photometric signal output from said photoelectric conversion device in the high-brightness side photometry.

14. The photometric control device as claimed in claim 13, wherein said photoelectric conversion device includes a light-receiving and accumulating unit for producing electric charges in proportion to incident light from the subject field and accumulating the produced electric charges; a transfer unit for transferring the electric charges accumulated in said light-receiving and accumulating unit; a voltage conversion unit for receiving the electric charges from said transfer unit and converting the electric charges to a voltage to output the converted voltage as the photometric signal; an accumulation gate unit for controlling the start and termination of the electric charge accumulation of said light-receiving and accumulating unit; and further comprising A/D conversion means for conducting A/D conversion on the photometric signal output from said voltage conversion unit.

15. The photometric control device as claimed in claim 14, wherein said accumulation time calculating means includes first calculating means for calculating and setting the low-brightness side accumulation time for a next low-brightness side photometry so that the maximum value of the low-brightness side photometric signal which is A/D-converted by said A/D conversion means is equal to the upper-limit value of the A/D convertible range in the next low-brightness side photometry when the maximum value of the low-brightness side photometric signal is lower than the upper-limit value of an A/D convertible range.

16. The photometric control device as claimed in claim 15, wherein said accumulation time calculating means includes second calculating means for setting the high-brightness side accumulation time for a next high-brightness side photometry to the low-brightness side accumulation time calculated by said first calculating means when the maximum value of the A/D-converted low-brightness side photometric signals is lower than the upper-limit value of the A/D convertible range.

17. The photometric control device as claimed in claim 14, wherein said accumulation time calculating means includes third calculating means for setting the low-brightness side accumulation time for the next low-brightness side photometry to be longer than the current low-brightness side accumulation time when the minimum value of the A/D-converted low-brightness side photometric signal is lower than a predetermined value, and calculating and setting the low-brightness side accumulation time for the next low-brightness side photometric operation so that the minimum value of the A/D converted low-brightness side photometric signal is equal to said predetermined value when the minimum value of the A/D converted low-brightness side photometric signal is above the predetermined value.

18. The photometric control device as claimed in claim 14, wherein said accumulation time calculating means includes fourth calculating means for calculating and setting the high-brightness side accumulation time for the next high-brightness side photometry so that the minimum value of the high-brightness side photometric signal obtained through the next high-brightness side photometry is equal to the upper-limit value of the A/D convertible range of the next low-brightness side photometry.

19. The photometric control device as claimed in claim 18, wherein said fourth calculating means calculates and sets the high-brightness side accumulation time for the next high-brightness side photometry so that the maximum value of the A/D-converted high-brightness side photometric signal is equal to the upper-limit value of the A/D convertible range of the next high-brightness side photometry when the maximum value of the A/D-converted high-brightness side photometric signal is lower than the upper-limit value of the A/D convertible range.

20. The photometric control device as claimed in claim 14, wherein said accumulation time calculating means includes first calculating means for calculating and setting the low-brightness side accumulation time for the next low-brightness side photometry so that the maximum value of the A/D-converted low-brightness side photometric signal is equal to the upper-limit value of the A/D convertible range of the next low-brightness side photometry when the maximum value of the A/D-converted low-brightness side photometric signal is lower than the upper-limit value of the A/D convertible range;

second calculating means for setting the high-brightness side accumulation time for the next high-brightness side photometry to the low-brightness side accumulation time calculated by said first calculating means when the maximum value of the A/D-converted low-brightness side photometric signal is lower than the upper-limit value of the A/D convertible range;

third calculating means for setting the low-brightness side accumulation time for the next low-brightness side photometry to be longer than the current low-brightness side accumulation time when the minimum value of the A/D-converted low-brightness side photometric signal is lower than a predetermined value, and calculating and setting the low-brightness side accumulation time for the next low-brightness side photometry so that the minimum value of the low-brightness side photometric signal is equal to the predetermined value when the minimum value of the low-brightness side photometric signal is above the predetermined value; and fourth calculating means for calculating and setting the high-brightness side accumulation time for the next high-brightness side photometry so that the minimum value is equal to the upper-limit value of the A/D convertible range of the next low-brightness side photometry when the maximum value of the A/D-converted high-brightness side photometric signal is equal to the upper-limit of the A/D convertible range, and calculating and setting the high-brightness side accumulation time for the next high-brightness side photometry so that the maximum value of the A/D-converted high-brightness side photometric signal is equal to the upper-limit value of the A/D convertible range for the next high-brightness side photometry when the maximum value of the A/D-converted high-brightness side photometric signal is lower than the upper-limit value of the A/D convertible range.

21. The photometric control device as claimed in claim 14, wherein said accumulation time calculating means includes a limiting unit for limiting the calculated accumulation time within a predetermined time when the calculated accumulation time exceeds the predetermined time.

22. The photometric control device as claimed in claim 14, further comprising brightness value calculating means for calculating brightness values using only those photometric signals which are lower than the upper-limit value of the A/D convertible range and not less than a predetermined value of all photometric signals which are subjected to A/D conversion by said A/D conversion means.

23. The photometric control device as claimed in claim 12, further comprising brightness value calculating means for calculating the brightness values using the low-brightness side photometric signal or high-brightness side photometric signal every time the low-brightness side photometry or high-brightness side photometry is carried out, and exposure value calculating means for calculating the exposure value from the brightness value every time the brightness value is calculated by said brightness value calculating means.

24. A photometric control device for a camera comprising:

an electric charge-accumulation type photoelectric conversion device having plural picture elements for photoreceiving and photoelectrically converting a flux of lights from plural regions of a subject field and outputting plural photometric signals corresponding to the plural regions of the subject field for exposure value calculation; and a photometry controller that calculates an accumulation time for a next operation of said photoelectric conversion device using both a number of maximum values of the photometric signals and a number of minimum values of the photometric signals;

said photometry controller actuating said photoelectric conversion device for the calculated accumulation time.

25. The photometric control device of claim 24, wherein said photometry controller calculates brightness values of the plural regions of the subject field on the basis of the accumulation time of said photoelectric conversion device and based on the photometric output signals from said photoelectric conversion device, said photometry controller calculating the accumulation time using both a number of maximum brightness values and a number of minimum brightness values.

26. The photometric control device of claim 24, wherein said photoelectric conversion device is repetitively actuated when a photometry instruction is being output from said photometry controller.

27. The photometric control device of claim 25, wherein said photometry controller counts the number of the brightness values equal to the maximum brightness value when the maximum brightness value is equal to an upper-limit value of a photometric brightness range of said photoelectric conversion device, said photometry controller calculating the accumulation time for a next operation of said photoelectric conversion device on the basis of the number of the maximum values counted.

28. The photometric control device of claim 25, wherein said photometry controller counts the number of brightness values equal to the minimum value of the brightness values when the minimum brightness value is equal to a lower-limit value of a photometric brightness range of said photoelectric conversion device, said photometry controller calculating an accumulation time for a next operation of said photoelectric conversion device on the basis of the number of the minimum values counted.

29. The photometric control device of claim 30, wherein said photometry controller calculates the accumulation time for a next operation of said photoelectric conversion device so that an average of the maximum and minimum brightness values is equal to a median value of the photometric brightness range for the next operation of said photoelectric conversion device.

30. The photometric control device of claim 28, wherein said photometry controller counts the number of the maximum brightness values when the maximum brightness value is equal to an upper-limit value of a photometric brightness range of said photoelectric conversion device, and wherein said photometry controller counts the number of the minimum brightness values when the minimum brightness value is equal to a lower-limit value of the photometric brightness range of said photoelectric conversion device, said photometry controller calculating the accumulation time for a next operation of said photoelectric conversion device on the basis of the number of maximum and minimum brightness values.

31. The photometric control device as claimed in claim 30, wherein said photometry controller calculates and sets the accumulation time for the next operation of said photoelectric conversion device to be shorter than the accumulation time for the current operation of said photoelectric conversion device when the number of maximum brightness values is larger than the number of minimum brightness values, and sets the accumulation time for the next operation of said photoelectric conversion device to be longer than the accumulation time for the current operation of said photoelectric conversion device when the number of maximum brightness values is smaller than the number of minimum brightness values.

32. The photometric control device as claimed in claim 31, wherein said photometry controller calculates and sets the accumulation time for the next operation of said photoelectric conversion device so that an average of the maximum and minimum brightness values is equal to the median value of the photometric brightness range for the next operation of said photoelectric conversion device when a difference between the maximum and minimum brightness values is smaller than a predetermined value, and, wherein said photometry controller calculates and sets the accumulation time for the next operation of said photoelectric conversion device to be shorter than the accumulation time for the current operation of said photoelectric conversion device when the difference between the maximum and minimum brightness values is above said predetermined value and the number of maximum brightness values is larger than the number of minimum brightness values, and, wherein the photometry controller calculates and sets the accumulation time for the next operation of said photoelectric conversion device to be longer than the accumulation time for the current operation of said photoelectric conversion device when the difference between the maximum and minimum brightness values is above said predetermined value, and the number maximum brightness values is smaller than the number of minimum brightness values.

33. A photometric control device for a camera comprising:

an electric charge-accumulation type of photoelectric conversion device having plural picture elements for photoreceiving and photoelectrically converting a flux of lights from plural regions of a subject field and outputting plural photometric signals corresponding to the plural regions of the subject field for exposure value calculation;

a photometry controller that calculates and sets a low-brightness side accumulation time for conducting a low-brightness side photometry and a high-brightness side accumulation time for conducting a high-brightness side photometry;

said photometry controller actuates said photoelectric conversion device on the basis of the low-brightness side accumulation time to conduct low-brightness side photometry, and actuates said photoelectric conversion device on the basis of the high-brightness side accumulation time to conduct high-brightness side photometry.

34. The photometric control device of claim 33, wherein said photometry controller calculates brightness values on the basis of low-brightness side photometric signals output from said photoelectric conversion device in the low-brightness side photometry, and high-brightness side photometric signals output from said photoelectric conversion device in the high-brightness side photometry.

35. The photometric control device of claim 33, wherein said photometry controller controls the driving of said photoelectric conversion device so that the low-brightness side photometry and the high-brightness side photometry are alternately and repetitively carried out when a photometric instruction is being output from said photometry controller.

36. The photometric control device of claim 35, wherein said photometry controller calculates and sets the low-brightness side accumulation time for a next low-brightness side photometry on the basis of low-brightness side photometric signals output from said photoelectric conversion device in the low-brightness side photometric operation; and said photometry controller calculates and sets the high-brightness side accumulation time for a next high-brightness side photometry based on high-brightness side photometric signals output from said photoelectric conversion device in the high-brightness side photometry.

37. The photometric control device of claim 36, wherein said photoelectric conversion device includes:

a light-receiving and accumulating unit that produces and accumulates plural electric charges in proportion to incident light from plural regions of the subject field;

a transfer unit that transfers the electric charges accumulated in said light-receiving and accumulating unit;

a voltage conversion unit that receives the electric charges from said transfer unit and converts the electric charges to voltages which are output as analog photometric signals;

an accumulation gate unit that controls the start and termination of the electric charge accumulation of said light-receiving and accumulating unit; and an analog-to-digital processor that converts the analog photometric signals to digital photometric signals.

38. The photometric control device of claim 37, wherein said photometry controller calculates and sets the low-brightness side accumulation time for a next low-brightness side photometry so that the maximum value of the low-brightness side digital photometric signals is equal to an upper-limit value of an analog-to-digital convertible range in the next low-brightness side photometry when a maximum value of the low-brightness side digital photometric signals of the current low-brightness side photometry is lower than an upper-limit value of the analog-to-digital convertible range.

39. The photometric control device of claim 38, wherein said photometry controller calculates and sets the high-brightness side accumulation time for a next high-brightness side photometry to the low-brightness side accumulation time when a maximum value of the low-brightness side digital photometric signals is lower than an upper-limit value of the analog-to-digital convertible range.

40. The photometric control device of claim 37, wherein said photometry controller calculates and sets the low-brightness side accumulation time for the next low-brightness side photometry to be longer than the current low-brightness side accumulation time when a minimum value of the low-brightness side digital photometric signals of the current low-brightness side photometry is lower than a predetermined value, and said photometry controller calculates and sets the low-brightness side accumulation time for the next low-brightness side photometry so that the minimum value of the low-brightness side digital photometric signals is equal to said predetermined value when the minimum value of the low-brightness side digital photometric signals of the current low-brightness side photometry is above the predetermined value.

41. The photometric control device of claim 37, wherein said photometry controller calculates and sets the high-brightness side accumulation time for the next high-brightness side photometry so that a minimum value of the high-brightness side digital photometric signals obtained through the next high-brightness side photometry is equal to an upper-limit value of an analog-to-digital convertible range of the next low-brightness side photometry.

42. The photometric control device of claim 41, wherein said photometry controller calculates and sets the high-brightness side accumulation time for the next high-brightness side photometry so that a maximum value of the high-brightness side digital photometric signals is equal to an upper-limit value of the analog-to-digital convertible range of the next high-brightness side photometry when the maximum value of the high-brightness side digital photometric signals of the current high-brightness side photometry is lower than the upper-limit value of the analog-to-digital convertible range.

43. The photometric control device of claim 37, wherein said photometry controller calculates and sets the low-brightness side accumulation time for the next low-brightness side photometry so that a maximum value of the low-brightness side digital photometric signals is equal to an upper-limit value of an analog-to-digital convertible range of the next low-brightness side photometry when the maximum value of the low-brightness side digital photometric signals of the current low-bright side photometry is lower than the upper-limit value of the analog-to-digital convertible range;

said photometry controller calculates and sets the high-brightness side accumulation time for the next high-brightness side photometry to the low-brightness side accumulation time when the maximum value of the low-brightness side digital photometric signals is lower than the upper-limit value of the analog-to-digital convertible range;

said photometry controller calculates and sets the low-brightness side accumulation time for the next low-brightness side photometry to be longer than the current low-brightness side accumulation time when a minimum value of the low-brightness side digital photometric signals is lower than a predetermined value, said photometry controller calculates and sets the low-brightness side accumulation time for the next low-brightness side photometry so that the minimum value of the low-brightness side digital photometric signals is equal to the predetermined value when the minimum value of the low-brightness side digital photometric signals of the current low-brightness side photometry is above the predetermined value;

said photometry controller calculates and sets the high-brightness side accumulation time for the next high-brightness side photometry so that the minimum value of the high-brightness side digital photometric signals is equal to the upper-limit value of the analog-to-digital convertible range of the next low-brightness side photometry when the maximum value of the high-brightness side digital photometric signals is equal to the upper-limit of the analog-to-digital convertible range, and said photometry controller calculates and sets the high-brightness side accumulation time for the next high-brightness side photometry so that the maximum value of the high-brightness side digital photometric signals is equal to the upper-limit value of the analog-to-digital convertible range for the next high-brightness side photometry when the maximum value of the high-brightness side digital photometric signals of the current high-brightness side photometry is lower than the upper-limit value of the analog-to-digital convertible range.

44. The photometric control device of claim 37, wherein said photometry controller limits the accumulation time to be within a predetermined time when the calculated accumulation time exceeds a predetermined time.

45. The photometric control device of claim 37, wherein said photometry controller calculates brightness values for those digital photometric signals that are lower than an upper-limit value of an analog-to-digital convertible range and not less than a predetermined lower limit.

46. The photometric control device of claim 37, wherein said photometry controller calculates brightness values using the low-brightness side digital photometric signals and the high-brightness side digital photometric signals every time a low-brightness side photometry or high-brightness side photometry is carried out, and wherein said photometry controller calculates an exposure value based on the brightness values every time the brightness values are calculated.

47. A method of controlling an electric charge-accumulation type of photoelectric conversion device in a camera, said photoelectric conversion device including plural picture elements that photoreceive and photoelectrically convert a flux of lights from plural regions of a subject field and output respective photoelectric conversion outputs as photometric signals for exposure value calculation, said method including the steps of:

determining an accumulation time for use during a charge accumulation operation of said photoelectric conversion device based on a number of maximum values and a number of minimum values of said photometric signals previously output by said photoelectric conversion device.

48. The method of claim 47, wherein said accumulation time determining step includes:

operating the photoelectric conversion device for a predetermined accumulation time to determine brightness values of the plural regions of the subject field;

determining the maximum brightness value;

determining the minimum brightness value;

counting the number of brightness values equal to the maximum brightness value;

counting the number of brightness values equal to the minimum brightness value;

calculating a new accumulation time based on the average of the maximum and minimum brightness values when the difference between the maximum and minimum brightness values does not exceed an operating range of the photoelectric device; and calculating a new accumulation time that is longer than the predetermined accumulation time when the number of minimum brightness values exceeds the number of maximum brightness values and that is shorter than the predetermined accumulation time when the number of maximum brightness values exceeds the number of minimum brightness values when the difference between the maximum and minimum brightness values exceeds the range of the photoelectric device; and further comprising the steps of:

calculating an exposure value based on the brightness values; and repeating the above steps while a photometry signal is present.

49. The method of claim 48, further comprising the step of:

limiting the new accumulation time to be shorter than a preset maximum accumulation time and longer than a preset minimum accumulation time.

50. The method of claim 47, wherein said accumulation time determining step includes:

operating the photoelectric conversion device for a predetermined accumulation time to determine the brightness values of the plural regions of the subject field;

calculating a total number of minimum brightness values;

calculating a total number of maximum brightness values;

calculating a new accumulation time that is longer than the predetermined accumulation time when the total number of minimum brightness values exceeds the total number of maximum brightness values and that is shorter than the predetermined accumulation time when the total number of maximum brightness values exceeds the total number of minimum brightness values; and further comprising the steps of:

calculating an exposure value based on the brightness values; and repeating the above steps while a photometry signal is present.

51. The method of claim 50, further comprising the step of:

limiting the new accumulation time to be shorter than a preset maximum accumulation time and longer than a preset minimum accumulation time.

52. The method of claim 50, further comprising the step of:

calculating a new accumulation time that is shorter than the predetermined accumulation time when the total number of minimum brightness values is zero.

53. The method of claim 50, further comprising the step of:

calculating a new accumulation time that is longer than the predetermined accumulation time when the total number of maximum brightness values is zero.

54. The method of claim 50, wherein the new accumulation time is only calculated when a difference between the total number of minimum brightness values and the number of maximum brightness values exceeds a predetermined amount.

55. A method of controlling an electric charge-accumulation type of photoelectric conversion device in a camera, said photoelectric conversion device including plural picture elements that photoreceive and photoelectrically convert a flux of lights from plural regions of a subject field and output respective photoelectric conversion outputs as photometric signals for exposure value calculation, said method including the steps of:

operating said photoelectric conversion device for a low-brightness accumulation time period to determine brightness values of the plural regions of said subject field; and operating said photoelectric conversion device for a high-brightness accumulation time period shorter than said low-brightness accumulation time period to determine further brightness values of the plural regions of said subject field.

56. The method of claim 55, further comprising:

setting a new low-brightness accumulation time period and a new high-brightness accumulation time period; and operating said photoelectric conversion device using said new low-brightness accumulation time period and said new high-brightness accumulation time period.

57. The method of claim 56, wherein the step of setting said new low and said high brightness accumulation time periods comprises the steps of:

increasing a duration of said new low-brightness accumulation time, and setting the new high-brightness accumulation time to be equal to the previous low-brightness accumulation time when the brightest region of the subject field did not exceed an operating range of the photoelectric conversion device during the previous low brightness accumulation operation;

decreasing the duration of said new low-brightness accumulation time when the brightest region of the subject field exceeded the operating range of the photoelectric conversion device during the previous low-brightness accumulation operation and a minimum brightness value of the previous low-brightness accumulation operation is greater than a predetermined minimum brightness value;

increasing the duration of said new low-brightness accumulation time when a brightest region of the subject field exceeded the operating range of the photoelectric conversion device during the previous low-brightness accumulation operation and the minimum brightness value of the previous low-brightness accumulation operation is smaller than the predetermined minimum brightness value;

increasing a duration of said new high-brightness accumulation time when the brightest region of the subject field did not exceed the operating range of the photoelectric conversion device during the previous high-brightness accumulation operation; and setting the new high-brightness accumulation time to be equal to a predetermined fraction of the low-brightness accumulation time when the brightest region of the subject field exceeded the operating range of the photoelectric conversion device during the previous high-brightness accumulation operation.

58. The method of claim 56, wherein the low-brightness and the high-brightness accumulation times are determined based on the current low brightness and high-brightness accumulation times.

* * * * *